(12) United States Patent
Izumi et al.

(10) Patent No.: US 6,836,523 B2
(45) Date of Patent: Dec. 28, 2004

(54) RADIATION MEASUREMENT DEVICE

(75) Inventors: Mikio Izumi, Kanagawa-ken (JP);
Masafumi Yamada, Osaka-fu (JP);
Tatsuyuki Maekawa, Tokyo (JP);
Teruji Tarumi, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 15 days.

(21) Appl. No.: 10/106,895

(22) Filed: Mar. 27, 2002

(65) Prior Publication Data

US 2002/0146087 A1 Oct. 10, 2002

(30) Foreign Application Priority Data

Mar. 28, 2001 (JP) .......................................... 2001-093306
Feb. 22, 2002 (JP) .......................................... 2002-046788

(51) Int. Cl.[7] .................................................. G21C 17/08
(52) U.S. Cl. ........................ 376/255; 376/245; 376/254; 376/259; 250/336.1; 250/339.02; 250/374; 250/388
(58) Field of Search ................................. 376/245, 255, 376/254, 259; 250/336.1, 339.02, 374, 388

(56) References Cited

U.S. PATENT DOCUMENTS

| 3,894,912 | A | * | 7/1975 | Cohn | .......................... | 376/259 |
|---|---|---|---|---|---|---|
| 4,170,733 | A | * | 10/1979 | Weiss | .......................... | 250/374 |
| 4,493,811 | A | * | 1/1985 | Seki et al. | .................. | 376/254 |
| 4,623,508 | A | * | 11/1986 | Glesius et al. | ............... | 376/254 |
| 4,920,548 | A |  | 4/1990 | Gaussa, Jr. et al. | .......... | 376/255 |
| 5,076,998 | A | * | 12/1991 | Graham | ....................... | 376/254 |
| 5,114,665 | A | * | 5/1992 | Ball et al. | .................... | 376/255 |
| 5,164,895 | A | * | 11/1992 | Lunz et al. | ..................... | 700/9 |
| 5,295,166 | A | * | 3/1994 | Oda | ............................. | 376/255 |
| 6,181,761 | B1 | * | 1/2001 | Izumi et al. | .................. | 376/254 |
| 6,339,629 | B1 | * | 1/2002 | Takeuchi et al. | ............. | 376/254 |
| 6,456,681 | B1 | * | 9/2002 | Goto et al. | ................... | 376/254 |

FOREIGN PATENT DOCUMENTS

| GB | 950947 | * | 3/1964 |
|---|---|---|---|
| JP | 5-45490 | * | 8/1991 |
| JP | 3-183983 |  | 8/1991 |
| JP | 3226698 | * | 10/1991 |
| JP | 6-112772 |  | 4/1994 |
| JP | 409274095 | * | 10/1997 |
| JP | 10-282241 |  | 10/1998 |
| JP | 2000-162366 |  | 6/2000 |
| JP | 2001-21654 |  | 1/2001 |

* cited by examiner

Primary Examiner—Michael J. Carone
Assistant Examiner—John Richardson
(74) Attorney, Agent, or Firm—Foley & Lardner LLP

(57) ABSTRACT

A radiation measurement device includes a radiation detector generating an analog signal containing pulse components, an A/D converter converting the analog signal into sampled data, an n-th power pulse discrimination unit calculating n-th power values of the sampled data to discriminate the pulse component, where n is two or more, and a pulse counter counting a number of the discriminated pulse components.

7 Claims, 12 Drawing Sheets

| DISCRIMINATION REVEL | SMALL (WHITE NOISE) | ORDINARY DETECTOR REVEL | LARGE (SURGE NOISE WITH SEVERAL MICROSECONDS PULSE WIDTH) |
|---|---|---|---|
| INTEGRATION DISCRIMINATION UNIT (6) | GOOD | GOOD | FAILURE |
| DIFFERENCE DISCRIMINATION UNIT (7) | FAILURE | GOOD | GOOD |

FAILURE : EASILY COUNT NOISE
GOOD : HARDLY COUNT NOISE

RADIATION MEASUREMENT DEVICE

CROSS-REFERENCE TO RELATED APPLICATIONS

This application is based upon and claims the benefit of priority from the prior Japanese Patent Applications No. 2001-93306 filed on Mar. 28, 2001, and No. 2002-46788 filed on Feb. 22, 2002, the entire contents of which are incorporated herein by reference.

BACKGROUND OF THE INVENTION

1. Field of the Invention

This invention relates to a device and a method for radiation measurement, applied to monitor the radiation in an extensive range for improving resistance to noises in a digital signal processing.

2. Description of the Related Art

As far as radiation measurement is concerned, if wide range radiation is measured, then the pulse measurement method and the Campbell measurement method are often used together.

Generally, the pulse measurement method counts the pulse number of a pulse signal from a radiation sensor, but if the pulses overlap and it cannot count by the pulse measurement method, the Campbell measurement method is performed.

For example, from six to ten start-up range neutron monitor sensors (SRNM sensors) and from one hundred to two hundred local power range monitor sensors (LPRM sensors) are installed inside of a reactor pressure vessel containing nuclear reactor core to monitor nuclear reactor power. A start-up range neutron monitor and a power range neutron monitor measure outputs of the SRNM sensors and the LPRM sensors, respectively, to monitor the nuclear reactor power in a monitoring range of about eleven figures.

In this composition, the start-up range neutron monitor is used to count the pulse number of an output signal of the SRNM sensor in order to monitor relatively low reactor output, that is, the output is in from $10^{-9}\%$ to $10^{-4}\%$ of effective full power of the reactor. This is henceforth called the pulse measurement method.

On the other hand, the Campbell measurement method, that is, the measuring of fluctuation power generated due to overlapping of the pulse outputted from the sensor, is used in order to monitor relatively high reactor output, that is, the output is in from $10^{-5}\%$ to $10\%$ of the effective full power of the reactor.

Hereafter, a conventional technical example of the pulse measurement method and the Campbell measurement method in a nuclear reactor start-up monitoring system, which is disclosed in Japanese Patent Disclosure (koukai) No. 2000-162366, which is equivalent to U.S. Pat. No. 6,181,761, is explained with reference to FIG. 18.

The nuclear reactor start-up monitoring system shown in FIG. 18 is composed of an SRNM sensor 1 for outputting an electric signal containing pulse components corresponding to the number of neutrons in response to neutrons generated in the nuclear reactor, an analog preamplifier 2, an A/D (analog-to-digital) converter 3, and a pulse counter 23, an integration counter 24, a power calculator 25, an arithmetic average calculator 26, and a reactor power monitoring system 27. The analog preamplifier 2 amplifies the electric signal having pulse components outputted from the SRNM sensor 1 to regularize the electric signal, and the A/D converter 3 converts an analog signal outputted from the preamplifier 2 to digital data sampled at intervals which are shorter than a pulse width of the pulse included in electric signal outputted from the SRNM sensor 1. The pulse counter (PC) 23 counts a number of pulses in the sampled data outputted from the A/D converter 3 and converts the number of the pulse to an output level value contained in relatively low range power of the nuclear reactor, and the integration counter 24 adds the sampled valve outputted from the A/D converter 3 to raise the measurement accuracy. The power calculator 25 calculates a power by squaring the added value of the integration counter 24, and the arithmetic average calculator 26 averages the power calculated by the power calculator 25. The reactor power monitoring system 27 continuously monitors the output at the start-up of the nuclear reactor based on the counter result of the pulse counter 23 and the calculation result of the arithmetic average calculator 26.

In the digital reactor start-up monitoring system of such a composition, the preamplifier 2 amplifies and regularizes a shape of a pulse included in the electric signal outputted from SRNM sensor 1, and the A/D converter 3 samples the amplified and regularized pulse at high speed and calculates the pulse by using one or more logical operations. Also, the pulse counter 23 counts the calculation results outputted from the A/D converter 3 as an output pulse of the sensor if each calculation result outputted from the A/D converter 3 is in a corresponding predetermined range, respectively.

On the other hand, the same sampled value is added in the integration counter 24 to lower into a level of a sampling rating required for the Campbell measurement method and to earn a dynamic range for improving the number of equivalent bits. The power calculator 25 adds square values of the results after performing band-pass-filter process for the results, and the arithmetic average calculator 26 averages the results calculated by the power calculator 25 and computes the Campbell output value. The pulse enumerated data and the Campbell output value are estimated by the nuclear reactor output evaluation unit 27 and are displayed as a nuclear reactor output.

In this composition, calculation limited to the sensor-outputting pulse can be carried out with excluding noises having long pulse widths by discrimination based on information of not only a pulse height of a pulse but a pulse width by the pulse calculator 23.

That is, in the reactor start-up monitoring system of FIG. 18, for example, the output signal of the SRNM sensor 1 containing a pulse with the pulse width of 100 nanoseconds is sampled at intervals of 25 nanoseconds.

Four sampled-data, from data No. k-3 to data No. k, denoted as S(k-3), S(k-2), S(k-1), and S(k) in order, respectively, which correspond to a pulse width, are used to calculation described below, as S(k-3) is a sampled value at a rise point of a pulse, S(k) is a sampled value at a fall point of the pulse, and two sampled data S(k-1), S(k-2) are in between S(k-3) and S(k). It considers a result Out(k) of this calculation as an index of pulse discrimination, and as a result, the pulse is counted as a neutron pulse if it is in a range of predetermined level.

$$\mathrm{Out}(k)=\{b^*S(k-2)+c^*S(k-1)\}-\{a^*S(k-3)+d^*S(k)\} \qquad (1),$$

where a, b, c and d are non-zero constants.

By this calculation, it becomes possible to calculate only signals having almost similar pulse widths as that of the output pulse of the SRNM sensor 1. That is, even if a large surge-like noise becomes overlapped on a signal pulse, it can count measured value exactly by deducting the ground level of the pulse.

In addition, by setting two or more indices such as the Out(k) for detecting a case corresponding to such a sensor pulse form as mentioned above and using AND logic among these indices, this discrimination performance can be improved further.

Thus, even if a surge-like noise with a pulse width of several microseconds overlaps, and is supposed to be guided into a pulse in an electric signal outputted from the SRNM sensor most easily, the surge-like noise can be removed nearly completely and a limited calculation of sensor pulses with a pulse width of about 100 nanoseconds can be performed.

On the other hand, in the Campbell measurement method, the power calculator 25 restricts a frequency band and calculates an average of square values of the sampled data. In this composition, since the frequency band can be set up by software programming, if a noise is in a certain frequency equivalent to a measurement band, changing the measurement band on the software programming can reduce guidance of the noise.

However, there are several subjects described below in the nuclear reactor start-up monitoring system according to the above-mentioned conventional technology.

A first subject concerns reduction of a bipolar noise. That is, if surge noise with a pulse width of several microseconds and sensor output pulse overlap, it is necessary to compute a value corresponding to a pulse peak value by using the difference between them in order to count the overlapped sensor output pulse without preparing dead time.

In taking the difference, if the pulse is homopolar, that is, either a positive pulse or a negative pulse, such as a sensor output pulse, a pulse discrimination level of the pulse is equivalent to a conventional pulse peak value from the ground level. However, if the pulse is bipolar, such as a white noise from a circuit resistance, it is necessary to discriminate voltage between peaks of the pulse from the pulse discrimination level. For this reason, the discrimination level necessary in this case is twice as much as that of conventional discrimination method using pulse peak from ground level.

Therefore, the discrimination level required to count the sensor output limitedly is needed about twice as much as that of the conventional method, and thus the ratio of sensor signal to white noise, that is, the signal-to-noise ratio (S/N ratio), worsens.

A second subject concerns improvement of resistance to noises in the Campbell measurement method. Conventional noise test of a motor, for example, shows that a surge noise with a pulse width of several microseconds is easily induced to the reactor start-up monitoring system.

In the pulse measurement method, this surge noise can be reduced by pulse discrimination according to the above-mentioned digital calculation. On the other hand, in the Campbell measurement method, a measurement band is set as a frequency band from several hundreds of hertz to one megahertz, which is selected according to a form of a sensor output pulse, and in the above-mentioned precedence example, the induction noise is removed by shifting this measurement band. However, since the frequency of the noise that is the easiest to be guided mostly falls in a range of the measurement band, it is difficult to remove the noise completely, and it is necessary to rectify sensor sensitivity because the sensitivity changes slightly.

Generally, a measurement device for measuring dose equivalent is optimized in a radiation incidence window, reaction volume, etc., of a sensor, so that sensitivity characteristics over gamma ray energy of the device may become equal to energy absorption characteristics of a human body. However, it is difficult to make the sensitivity characteristics in agreement correct because the sensitivity characteristics differ according to directions of incidence of gamma rays.

Moreover, as far as accurate conversion of the dose equivalent to a human body is concerned, since energy absorption characteristics differ according to parts of a human body, it is difficult for independent use of the measurement device modified to equalize to the sensor sensitivity over gamma ray energy to evaluate the dose equivalent in each part of a human body. Furthermore, when neutrons other than of a gamma ray, such as a beta ray, are intermingled, a sensor that has rectified its sensitivity by arranging sensor structure cannot estimate such mingled radiations, each of which has absorption characteristics which are greatly different from that of another radiation. Therefore, it must arrange a plurality of measurement systems each of which is used for measuring one radiation exclusively.

Conventionally, in order to solve these subjects, it is proposed and put in practical use to compute energy spectrum of a gamma ray to be converted to the dose equivalent. However, since this technique is based on acquisition of energy information by using pulse height, in a condition in which pileup of pulses is occurred, it becomes difficult to acquire the energy information and thus the accuracy of this technique worsens.

That is, although depending on a pulse width of a sensor output pulse, a maximum of conventional energy measurement is about $1*10^5$ counts per second (CPS). If it is supposed that a minimum of the measurement is one CPS, which must satisfy a response demand, a measurement range goes into about 5 figures. Thus, it is desired to realize a measurement method which enables to measure a dosage in more extensive range continuously.

Japanese Patent Disclosure (koukai) No. H3-183983 shows that dual structure of sensors in a radiation measurement device for measuring dose equivalent in depth of one centimeter improves measurement precision. In this technique, the above-mentioned pileup influence in the pulse measurement method is evaded by means of measuring current. However, sensor structure and processing in this technique are complicated, thus it is desired that they be simplified.

SUMMARY OF THE INVENTION

Accordingly, an object of this invention is to provide a device and a method for measuring radiation which improves noise resistance in the pulse measurement method and the Campbell measurement method using digital processing.

Another object of this invention is to provide a device and a method of radiation measurement which monitors a dosage in a wide range continuously with a convenient composition by applying the Campbell measurement method to the measurement of a radiation dosage.

Additional purposes and advantages of the invention will be apparent to persons skilled in this field from the following description, or may be learned by practice of the invention.

According to an aspect of this invention, there is provided a device for measuring radiation, including a radiation detector which generates an analog signal containing pulse components corresponding to a dosage of an inputted radiation, an analog-to-digital (A/D) converter which regularizes the analog signal outputted from the radiation detector and converts the regularized analog signal into sampled data, an n-th power pulse discrimination unit which calculates an n-th power value for each of the sampled data outputted from the A/D converter and discriminates the pulse components contained in the analog signal of the radiation based on the calculated n-th power values to generate a discrimination signal associated with each discriminated pulse component, where n is an integer of not less than two, and a pulse counter which counts a number of the discriminated pulse components based on the discrimination signal outputted from the n-th power discrimination unit.

According to another aspect of this invention, there is provided a device for measuring radiation, including a radiation detector which generates an analog signal containing pulse components corresponding to a dosage of an inputted radiation, an A/D converter which regularizes the analog signal outputted from the radiation detector and converts the regularized analog signal into sampled data, a band pass filter which limits the sampled data outputted from the A/D converter within a predetermined frequency band to generate restricted sampled data, an n-th power calculation unit which calculates the n-th power values of the restricted sampled data outputted from the band pass filter, where n is an integer of not less than two, a first smoothing unit which equalizes the n-th power values of the limited sampled data outputted from the n-th power calculation unit within a first time width to generate a first smoothed n-th power value, a data removal equalization unit which evaluates sizes of the first smoothed n-th power values outputted from the first smoothing unit within a second time width, removes a predetermined data removal number of the first smoothed n-th power values based on the evaluation result, and equalizes the first smoothed n-th power values after the removing within the second time width to generate a second smoothed n-th power value, a second smoothing unit which equalizes the equalized n-th power values outputted from the data removal and equalization unit to generate a third smoothed n-th power value, and a converter which converts the second smoothed n-th power value outputted from the second smoothing unit into a radiation intensity of the inputted radiation.

According to still another aspect of this invention, there is provided a device for measuring radiation, including a radiation detector which generates an analog signal containing pulse components corresponding to a dosage of an inputted radiation, an n-th moment calculation unit which calculates an average value of the n-th power values of pulse heights within a time width as an n-th moment value based on the analog signal outputted from the radiation detector, where n is an integer of not less than two, and where the pulse heights correspond to the pulse components included in the analog signal, a pulse counter which counts a number of pulse components based on the analog signal outputted from the radiation detector, an average energy calculation unit which calculates an average energy of the radiation based on a ratio of the n-th moment value calculated by the n-th moment calculation unit to the number of the pulse components counted by the pulse counter.

According to still another aspect of this invention, there is provided a device for measuring radiation, including a radiation detector which generates an analog signal containing pulse components corresponding to a dosage of an inputted radiation, an n-th moment calculation unit which calculates an average value of the n-th power values of pulse heights within a time width as an n-th moment value based on the analog signal outputted from the radiation detector, where n is an integer of not less than two, and where the pulse heights correspond to the pulse components included in the analog signal, a current measurement instrument which calculates an average current from the pulse heights of the pulse components included in the analog signal, and an average energy calculation unit which calculates an average energy of the radiation based on a ratio of the n-th moment value calculated by the n-th moment calculation unit to the average current calculated by the current measurement instrument.

According to still another aspect of this invention, there is provided a device for measuring radiation, including a radiation detector which generates an analog signal containing pulse components corresponding to a dosage of an inputted radiation, first to n-th moment calculation units each calculating an average value of one of first to n-th power values of pulse heights corresponding to the pulse components included in the analog signal within a time width as one of first to n-th moment values, respectively, where n is an integer of not less than three, and an average energy calculation unit which calculates an average energy of the radiation based on a ratio of two of the first to n-th power values calculated by the first to n-th moment calculation units, respectively.

According to still another aspect of this invention, there is provided a method of measuring radiation, including A/D converting an analog signal containing pulse components corresponding to a dosage of an inputted radiation outputted from a radiation detector into sampled data, calculating n-th power values of the sampled data, where n is an integer of not less than two, and discriminating the pulse components of the radiation contained in the analog signal based on the n-th power values of the sampled data.

According to still another aspect of this invention, there is provided a method of measuring radiation, including A/D converting an analog signal containing pulse components corresponding to a dosage of an inputted radiation outputted from a radiation detector into sampled data, calculating n-th power values of the sampled data, where n is an integer of not less than two, equalizing the n-th power values of the sampled data within a time width; and discriminating the pulse components of the radiation contained in the analog signal based on the equalized n-th power values of the sampled data.

According to still another aspect of this invention, there is provided a method of measuring radiation, including calculating an average value of n-th power values of pulse heights of pulse components corresponding to a dosage of an inputted radiation included in an analog signal outputted from a radiation detector within a time width, where n is an integer of not less than two; and calculating at least one of a radiation intensity of the inputted radiation and a dosage equivalent of the inputted radiation based on the average value.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings wherein.

DETAILED DESCRIPTION OF THE INVENTION

Figure 1:
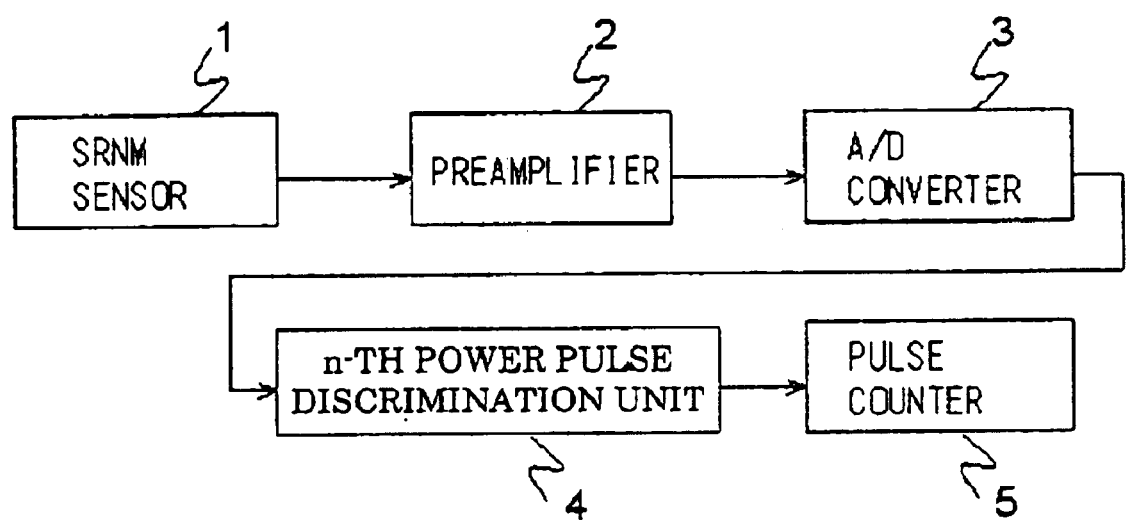
FIG. 1 is a basic block diagram showing a radiation measurement device of a first embodiment of this invention.

Referring now to the drawings, wherein like reference numerals designate identical or corresponding parts throughout the several views, the embodiments of this invention will be described below.

First Embodiment

A radiation measurement device of a first embodiment in this invention is explained with reference to FIG. 1.

The radiation measurement device shown in FIG. 1 is composed of an SRNM sensor 1 for generating an electric signal containing pulse components according to a radiation dosage in response to an inputted radiation, a preamplifier 2A for amplifying the output pulse, an A/D converter 3 for sampling the output pulse of the preamplifier 2A at intervals of time shorter than pulse duration of the output pulse to obtain sampled data, an n-th power pulse discrimination unit 4, and a pulse counter 5. The n-th power discrimination unit 4 is provided to calculate an n-th power value of the sampled data, corresponding to the pulse duration of the pulse from the SRNM sensor, and to discriminate a signal by comparing the calculated n-th power valve with a predetermined discrimination level. And the pulse counter 5 counts a pulse discriminated by the n-th power discrimination unit 4.

The SRNM sensor 1 is a nuclear fission sensor for outputting a signal containing pulse components, and it can also replace the sensor by an ionization chamber from which same kind of the pulse output of the SRNM sensor is obtained.

Figure 2:
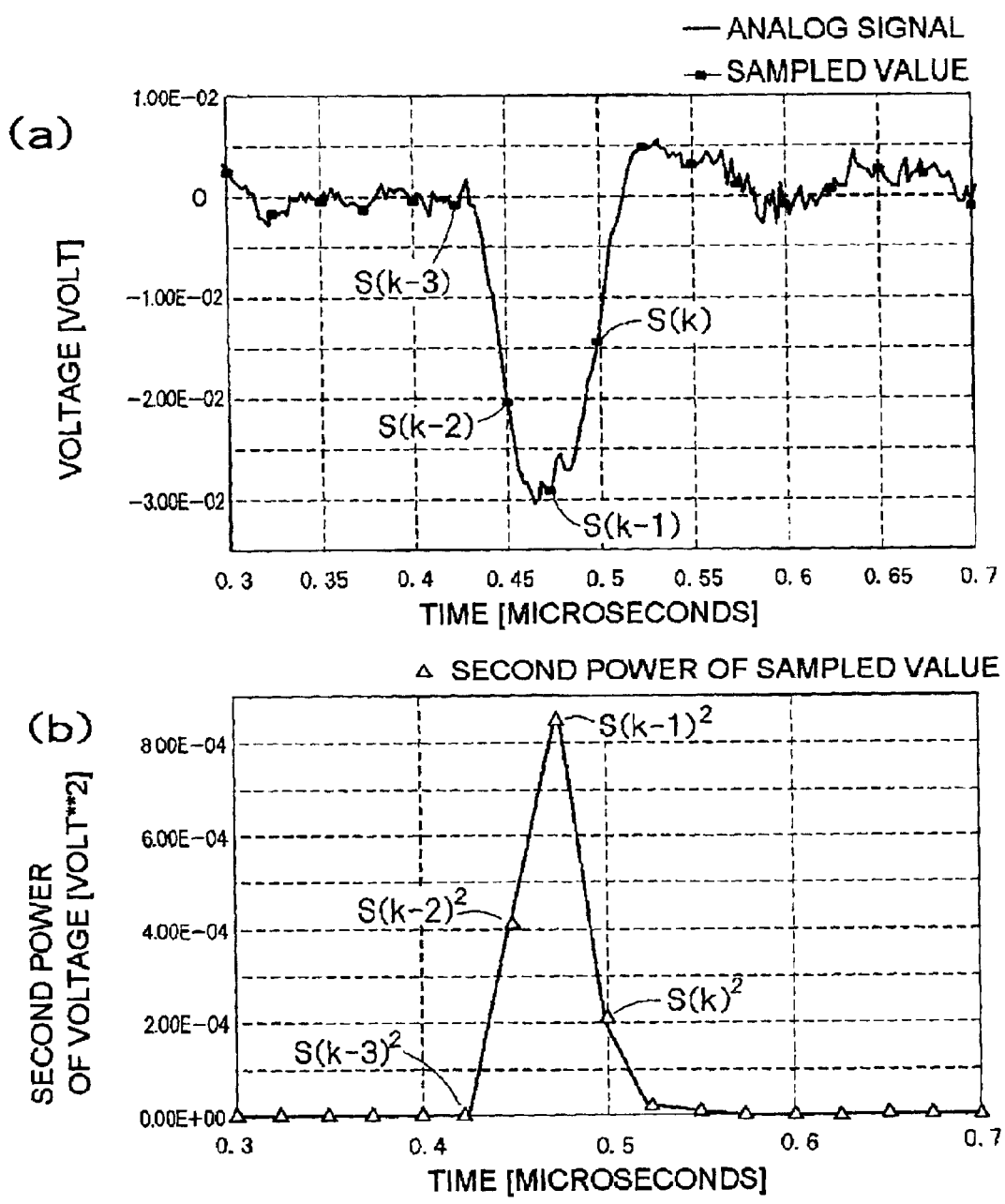
FIG. 2(a) is a graph showing an example of an SRNM sensor output pulse and sampled points.
FIG. 2(b) is a graph showing processing result of the SRNM sensor output shown in FIG. 2A, acquired in the first embodiment of this invention.

In such a composition, when neutrons are injected into the SRNM sensor 1 of this radiation measurement device and nuclear fission is occurred in the sensor 1, an electric analog signal containing pulse components as shown in FIG. 2(a) is outputted from the SRNM sensor. A pulse width of the pulse in this signal outputted from the SRNM sensor 1 is about 100 nanoseconds. This output signal is inputted into the preamplifier 2A and the pulse is amplified.

The preamplifier 2A also has a function to impress an operating voltage to the SRNM sensor 1. The signal with pulse components outputted from the preamplifier 2A is inputted into the A/D converter 3, and is sampled at sampling time intervals to be digitalized, as sampled data are shown by dots in FIG. 2(a). The shorter these sampling time intervals are, the more information about waveforms can be extracted, and if these sampling time intervals are sufficiently short, it is possible to count only the output pulse of the sensor correctly with excluding a signal due to an incoming foreign noise.

The A/D converter 3 also performs band-pass-filter processing for restricting to a frequency band which is necessary in the sampling theorem before the sampling of data. The sampled data outputted from the A/D converter 3 is inputted into an n-th power calculation unit in the n-th power pulse discrimination unit 4 to calculate the n-th power value of the data. That is, the n-th power calculation unit calculates an n-th power value of each sampled data, or multiplies by n pieces of sampled data which are placed sequentially. Here, n is an integer of not less than two. In case of calculating the n-th power value of each sampled data, it also performs equalization processing of two n-th power values placed sequentially. For example, when a pulse waveform is sampled at eight pieces, it performs equalization processing of two pieces of data placed sequentially after the calculating of each square value of each data, and consequently four values are acquired. In this case, it is also possible to perform moving-average processing to acquire eight pieces of sampled data.

FIG. 2(b) shows a trend of sampled data when performing square value calculation in a case that n is two, as one example. By transforming each sampled data into a square value, a pulse height ratio of the sensor output pulse to a noise component due to the circuit resistance can be improved to n-th power times as much as that of the conventional method.

However, when it uses values acquired by simple calculation of the n-th power value of every sampled data for pulse discrimination, the discrimination performance is the same as that in a case the sampled data is used for the pulse discrimination without calculation. Then, when calculating of the n-th power value in the digital operation, it is surely necessary to add a processing of multiplication of several pieces of data placed sequentially or a processing of equalization of the several pieces of data placed sequentially, after the n-th power calculation, as already stated. By comparing the calculation result acquired by this square calculation with a predetermined discrimination level, which has a minimum and a maximum, and recognizing the result comes from a sensor output pulse when the calculation result is within the predetermined discrimination level, it becomes easier to discriminate an output pulse of the SRNM sensor 1 from a coming foreign circuit noise.

By this radiation measurement device, a pulse discriminated by an output of the SRNM sensor 1 is converted into a pulse generating rate in the pulse counter 5, and is finally converted to a neutron flex level in a position of the SRNM sensor 1.

According to this embodiment of the invention, it can discriminate a pulse which has a pulse height of the same grade as a circuit noise level better than the conventional method calculating a difference.

Figure 3:
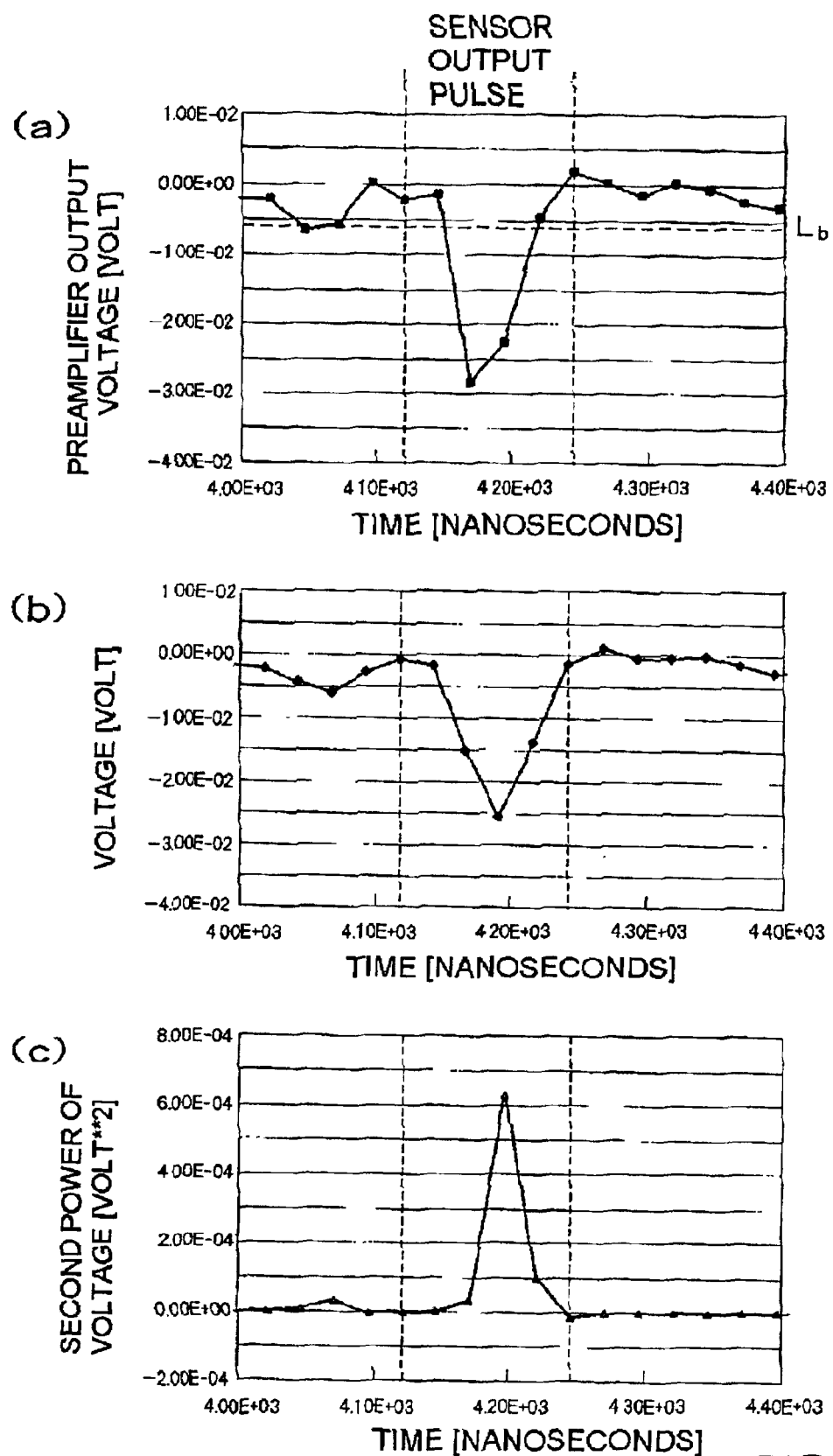
FIG. 3(a) is a graph showing an example of a sensor output pulse and a noise pulse of a circuit resistance.
FIG. 3(b) is a graph showing calculation result of the pulse shown in FIG. 3(a), acquired by conventional method for calculating arithmetical mean.
FIG. 3(c) is a graph showing processing result of the pulse shown in FIG. 3(a) acquired by an n-th power pulse measurement device in the first embodiment of this invention.

FIG. 3(a) shows an example of sampling of an amplified electric signal containing a white noise, which is one of foreign noise due to a circuit resistance with a relatively short pulse width, and a sensor output pulse outputted from the SRNM sensor 1 with a pulse height of the same grade as that of the white noise by A/D converter 3.

FIG. 3(a) shows a case that a sensor output pulse is generated at around $4.20*10^3$ nanoseconds, and in a section between two vertical dashed lines the sensor output pulse is overlapped with the white noise. And in an area other than this section, there is no sensor output pulse.

Suppose that a horizontal dashed line $L_b$ in FIG. 3(a) denotes a maximum of a discrimination level, if the conventional noise discrimination by a pulse height is performed to these data, one pulse at around $4.20*10^3$ nanoseconds including a white noise and a sensor output pulse is included in the discrimination level and another one pulse-like portion at around $4.05*10^3$ nanoseconds including a white noise and no sensor output pulse is also included in the discrimination level, thus the pulse counter counts both the pulse and the pulse-like portion. That is, as a result, a portion in which no output signal occurs is also counted, so in this method it cannot carry out an exact measurement.

Moreover, in the above-mentioned pulse count method using a difference between sampled data values, if a circuit noise is generated as a bipolar noise with both positive and negative components, a voltage difference between a positive peak and a negative peak of the bipolar noise in a certain time width is recognized as a pulse height in this time width. Thus, it cannot discriminate the circuit noise unless it raises a discrimination level to twice the voltage as that in the conventional discrimination method by seeking a pulse height value from zero volt.

On the other hand, FIG. 3(b) shows a calculation result of the sampled data shown in FIG. 3(a) acquired by a conventional method for calculating an arithmetical mean among three values lined sequentially. By calculating a arithmetic average, positive and negative components of the bipolar noise are cancelled and equalized. However, as far as a homopolar sensor output signal is concerned, it has originally one of a positive component and a negative component; thus the above-mentioned cancellation cannot be cancelled and the pulse width of the calculation result of data of such a homopolar signal becomes longer as shown in FIG. 3(b). While the pulse width becomes longer, in a condition in which there are a lot of output pulses included in a signal outputted from the sensor, there is a possibility where the pulses may overlap and the counting of a number of the pulses cannot be performed correctly and an upper count limit of the pulse measurement becomes lowered.

FIG. 3(c) shows a calculation result of the sampled data shown in FIG. 3(a) in the n-th power pulse discrimination unit 4 in this embodiment, here, for example, by calculating the square values of the sampled data values and afterward calculating an arithmetic average of three sequentially-lined square values.

By comparing a surrounded portion of two vertical dashed lines, including both the white noise and the sensor output pulse, with another portion left of the surrounded portion, it is found that calculated values in the surrounded portion definitely differ from calculated values in the another portion, thus the discrimination can be performed. That is, by setting a minimum of the discrimination level relatively close to zero, for example, around $1*10^{-4}$ volt**2, the pulse counter can count only the sensor output pulse, therefore, in this method, the discrimination performance can be improved from the conventional method calculating differences.

Moreover, compared with the conventional method as shown in FIG. 3(b), after the calculation, a pulse width composed of the calculated values is not prolonged comparatively; therefore, it can measure the pluses without worsening the upper count limit of the pulse.

If n is an odd integer in this embodiment, the above-mentioned method can equalize while maintaining signs of the bipolar noise; therefore and a homopolar signal can be discriminated from a bipolar noise signal with a good signal-to-noise ratio.

Therefore, in this embodiment, in setting a discrimination level of an output pulse, the discrimination level for removing a circuit noise or an alpha ray noise is set relatively low, and accordingly, even if the sensor output pulse is small, the pulse can be measured without lowering the measure sensitivity.

Second Embodiment

Figures 4, 5:
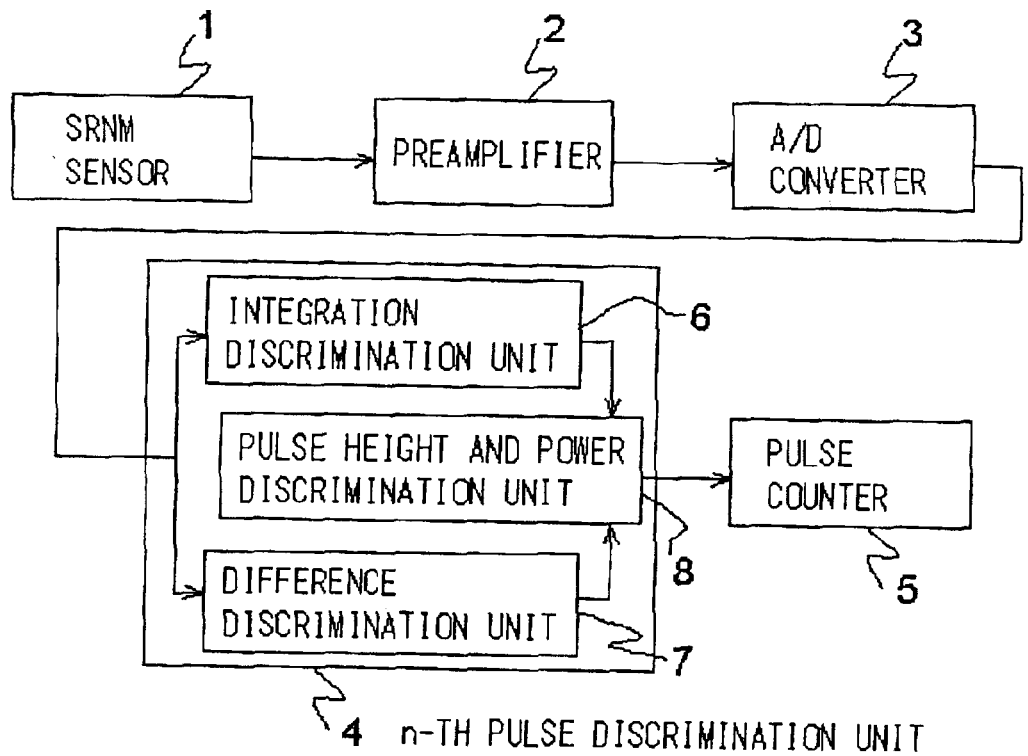
FIG. 4 is a basic block diagram showing a radiation measurement device of a second embodiment of this invention.
FIG. 5 is a chart for comparing features of a integration discrimination unit and a difference discrimination unit in the second embodiment of this invention.

A second embodiment according to this invention is explained with reference to FIG. 4. In this embodiment, an n-th power pulse discrimination unit 4 of the radiation measurement device shown in FIG. 4 is composed of an integration discrimination unit 6, a difference discrimination unit 6, and a pulse height and power discrimination unit 8.

An output of A/D converter 3 composed of the sampled data values is inputted into the integration discrimination unit 6, a difference discrimination unit 7, and outputs of these units 6, 7 are imputed to a pulse height and power discrimination unit 8. An output signal of the pulse height and power discrimination unit 8 is inputted into a pulse counter 5.

Here, in the integration discrimination unit 6, the pulse is discriminated according to the pulse discrimination method as explained in the first embodiment. That is, the integration discrimination unit 6 of the n-th power discrimination unit calculates the n-th power value of the sampled data values, and judges whether there is a sensor output pulse or not by comparing the n-th power values or arithmetic averages of every sequential n-th power values with a predetermined discrimination level.

A first example of discrimination method of the difference discrimination unit 7 in this embodiment is explained according to the following principle. Suppose that the maximum value and the bottom value of an output of the A/D converter 3 are denoted as Top(k) and Bottom(k), respectively, namely:

$$\text{Top}(k)=b*S(k-2)+c*S(k-1),$$

$$\text{Bottom}(k)=a*S(k-3)+d*S(k),$$

where a, b, c and d are non-zero constants. Then, the pulse height value High(k) in the above-mentioned conventional formula (1) can be denoted to be simplified as:

$$\text{High}(k)=+\text{Top}(k)-\text{Bottom}(k).$$

In this example of this embodiment, firstly, it calculates a difference of a square value of a top value Top(k) and a square value of a bottom value Bottom (k), which is hereafter denoted as X, is calculated, namely:

$$X = +\text{Top}(k)^2 - \text{Bottom}(k)^2$$
$$= (\text{Top}(k) - \text{Bottom}(k)) * (\text{Top}(k) + \text{Bottom}(k))$$
$$= \text{High}(k) * (\text{Top}(k) + \text{Bottom}(k)) \quad (2)$$

Here, when a sensor output signal pulse is superimposed only on a usual circuit noise such as a white noise (hereinafter it is called Case 1), Top(k) is extremely larger than Bottom(k); therefore the formula (2) can be replaced to an approximate formula such as:

$$X = \text{High}(k) * \text{Top}(k) \quad (3).$$

On the other hand, when the signal pulse is superimposed on an extremely large surge noise (hereinafter called Case 2), Top(k) equals approximately Bottom(k) as an approximation; thus, the formula (2) can be expressed with an approximate formula such as:

$$X = \text{High}(k) * (2 * \text{Top}(k)) \quad (4).$$

Thus, from the formulas (3) and (4), it holds the relation as:

$$X/\text{Top}(k) = \alpha * \text{High}(k) \quad (5),$$

Provided $\alpha$ is either one or two, that is, $\alpha$ equals one in Case 1 and $\alpha$ equals two in Case 2; therefore, the value X/Top(k) mostly serves as a linear function of the pulse height High (k).

That is, even when the output pulse of the SRNM sensor is overlapped on the surge noise, it becomes possible to discriminate and calculate the SRNM sensor output pulse of several hundreds of nanoseconds which overlapped on the surge noise with a cycle of several microseconds, by the discrimination comparing the above-mentioned value X divided by Top(k) with a predetermined discrimination level.

Thus, according to this first example of the second embodiment, even if a foreign noise with a pulse width longer than that of the sensor pulse is induced, the influence due to the foreign noise can be reduced by the discrimination using difference of the n-th power values.

Next, a second example of discrimination method of the difference discrimination unit 7 in this embodiment is explained according to the following principle. In the formula (1), say, $$D1(k) = c * S(k-1) - d * S(k) \quad (6),$$
$$D2(k) = -a * S(k-3) + b * S(k-2) \quad (7).$$

Thus, the peak value High (k) is denoted as follows:

$$\text{High}(k) = +D1(k) + D2(k) \quad (8).$$

The sum of the n-th power values of each member in the right side of the equation (8), denoted as Y hereinafter, is $$Y = D1(k)^n + D2(k)^n.$$

And this formula is deformed, as an approximation, to the following:

$$Y = \text{High}(k)^n.$$

That is, $$Y^{-n} = \text{High}(k).$$

Thus, in this case, the pulse discrimination is possible by calculating the value $Y^{-n}$ as an approximate index for comparing with a predetermined discrimination level. In addition, it is equivalent to a formula (1) when n=1 in this case.

As mentioned above, even when the output pulse of the SRNM sensor 1 is overlapped on a surge-like noise, it is possible to discriminate and calculate the output pulse of the SRNM sensor 1 for several hundreds of nanoseconds which overlapped on the surge noise with a cycle of several microseconds by using the index acquired by calculating the difference.

As mentioned in the first embodiment, for counting a number of pulses, the integration discrimination unit 6 is effective in excluding influence of bipolar noises, such as a white noise, having an incoming interval shorter than the pulse duration of the sensor output, and is also effective in excluding influence of noises with pulse components having pulse heights smaller than that of the sensor output pulse, for example, a circuit noise or an alpha ray noise of the sensor. On the other hand, the difference discrimination unit 7 is effective to noises having a cycle longer than pulse duration of an output pulse of the SRNM sensor 1, and in general it is also effective to remove foreign induced noises having a pulse duration of several microseconds.

Therefore, by adjusting logics of these units most suitable, respectively, it can calculate the sensor output only by counting the pulse only when conditions of these units are both effected.

As mentioned above, according to the first example and the second example of this second embodiment, by using an n-th power value of a difference of the sampled data corresponding to a pulse height, the influence due to foreign noises with a pulse width longer than that of the sensor output pulse can be reduced, and thus it becomes possible to perform radiation measurement with higher accuracy, as well as the first example of the second embodiment.

Next, a composition of the pulse height and power discrimination unit 8 is explained as a third example of this embodiment.

The pulse height and power discrimination unit 8 receives an integral value of a pulse from the integration discrimination unit 6 and a value corresponding to a pulse height value of a pulse from the difference discrimination unit 7. A ratio of these values, that is, an integral value divided by the pulse height value, is mostly shown as a certain fixed value equivalent to a pulse width when the pulse is a sensor output pulse.

On the other hand, since the white noise containing a high frequency component has a small integration value even if the pulse height value of the noise is equivalent to a sensor output pulse, this ratio of the white noise becomes small. Moreover, since the surge noise with a long pulse width has a large integration value and a small pulse height value, this ratio of the surge noise becomes larger than that of the sensor output. Therefore, by calculating this ratio in the pulse height and power discrimination unit 8 and setting the pulse counter 5 for counting as a pulse when this ratio is within a predetermined certain range, the influence due to these noises can be reduced.

As mentioned above, in this pulse measurement method, even if a surge-like foreign noise is induced, when the surge-like noise has a cycle of several microseconds, which is longer than pulse duration of the sensor output pulse, that is 100 nanoseconds, the influence due to the surge-like noise can be eliminated and it can also count pulses overlapped on the noise.

Thus, according to this third example of this embodiment, by using both the pulse calculation method using the difference mentioned in the first or the second example of this embodiment and the pulse calculation method using the n-th power value mentioned in the first embodiment, it can measure pulses accurately with accompanying characteristics of the both methods.

Third Embodiment

Figure 6:
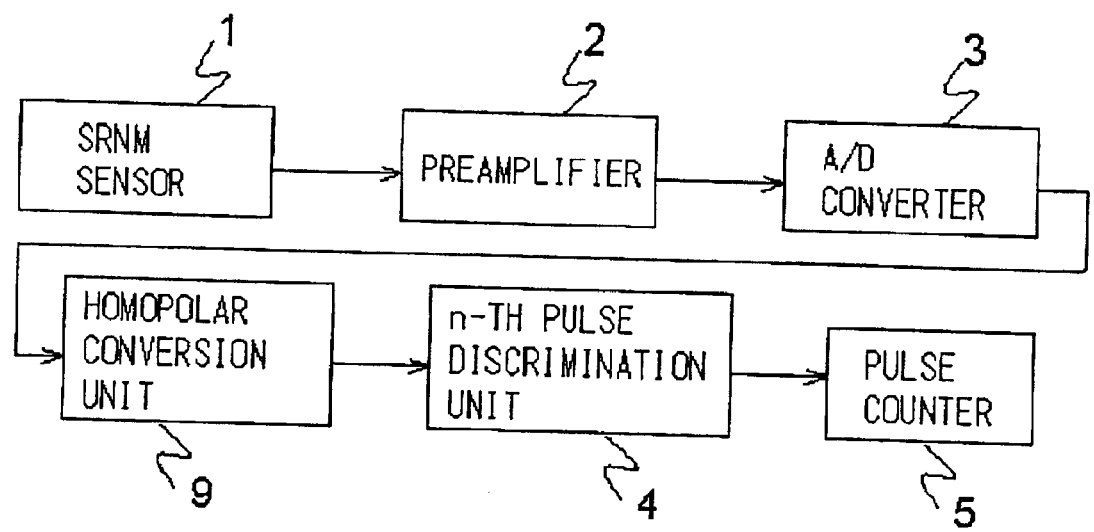
FIG. 6 is a basic block diagram showing a radiation measurement device of a third embodiment of this invention.

Next, a third embodiment in this invention is explained with reference to FIG. 6. A radiation measurement device of the third embodiment shown in FIG. 6 is characterized as a homopolar conversion unit 9 for converting a bipolar signal into a homopolar signal, which is either a non-negative signal or a non-positive signal, according to the polarity of a main component of a pulse contained in an inputted signal, and which is arranged between the A/D converter 3 and the n-th power pulse discrimination unit 4 in the first embodiment of this invention shown in FIG. 1.

In addition, like the first embodiment, although the SRNM detector 1 is a nuclear fission detector from which a pulse output is acquired, radiation detectors, such as an ionization chamber from which the other pulse outputs can be acquired, can be applied to the detector instead of the SRNM detector 1 in this embodiment.

Figure 7:
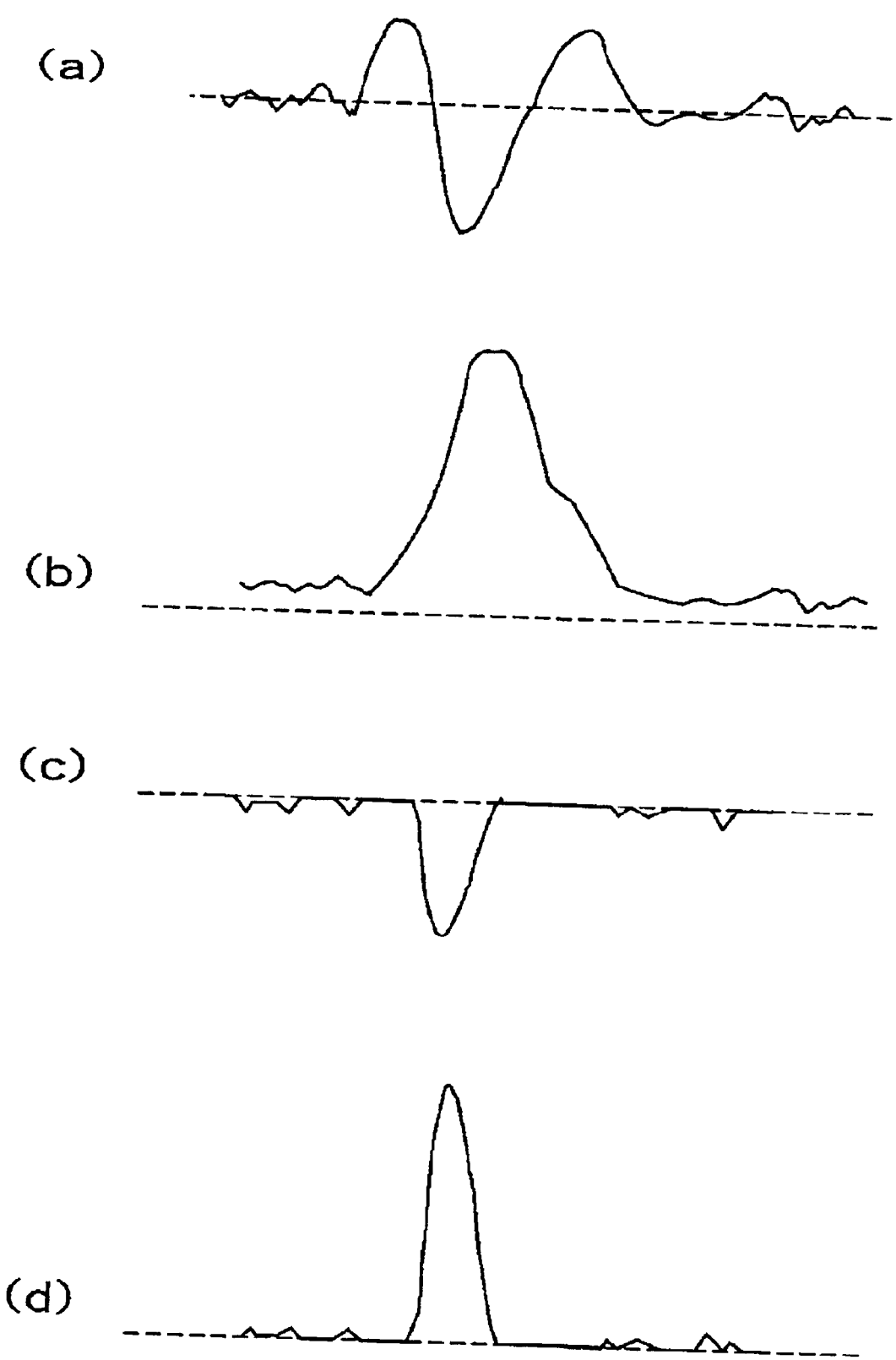
FIG. 7(a) is a waveform chart showing an example of a pulse waveform acquired by secondary differentiation processing of a detector output.
FIG. 7(b) is a waveform chart showing a pulse acquired by processing of the pulse shown in FIG. 7(a) by an n-th power pulse discrimination unit in the first embodiment.
FIG. 7(c) is a waveform chart showing a pulse acquired by processing of the pulse shown in FIG. 7(a) by a homopolar conversion unit in the third embodiment.
FIG. 7(d) is a waveform chart showing a pulse acquired by processing of the pulse shown in FIG. 7(c) by the n-th power pulse discrimination unit.

In this embodiment of such a constitution, a function of the homopolar conversion unit 9 is explained with reference to FIG. 7. FIG. 7(a) shows an example of a pulse waveform when performing secondary differentiation processing to a sensor utput, such as a pulse shown in FIG. 2(a). In this embodiment, it is possible to construct the secondary differentiation processing by processing in an analog circuit in the preamplifier 2, or by digitally processing the secondary differentiation calculation to data sampled by the A/D converter 3, both of which are available.

A result of average processing after n-th power calculation of the waveform shown in FIG. 7(a), where n is an even number, such as two, by the n-th power pulse discrimination unit 4 is shown in FIG. 7(b). In this calculation, since the bipolar waveform is changed to a homopolar (non-negative) waveform by setting n as an even number, the pulse duration is prolonged.

Then, since the main component of the pulse shown in FIG. 7(a) is negative, where the lower direction means negative in FIG. 7(a), the homopolar conversion unit 9 of this embodiment replaces the positive component of the signal shown in FIG. 7(a) with zero or a certain negative value close to zero, and converts to the waveform as shown in FIG. 7(c). A result of average processing after n-th power calculation of this waveform shown in FIG. 7(c), where n is an even number, such as two, is shown in FIG. 7(d). It is possible to narrow a spread of the pulse width compared with a case of FIG. 7(b) without using this homopolar conversion unit 9.

Therefore, in this embodiment, even when n is an even number, the pulse width is not prolonged, and thus it is possible to reduce incorrect counting due to pulse pileup which blocks to count one pulse by overlapping of pulses, and prevent a reduction in the measurement minimum of the pulse measurement.

Fourth Embodiment

Figure 8:
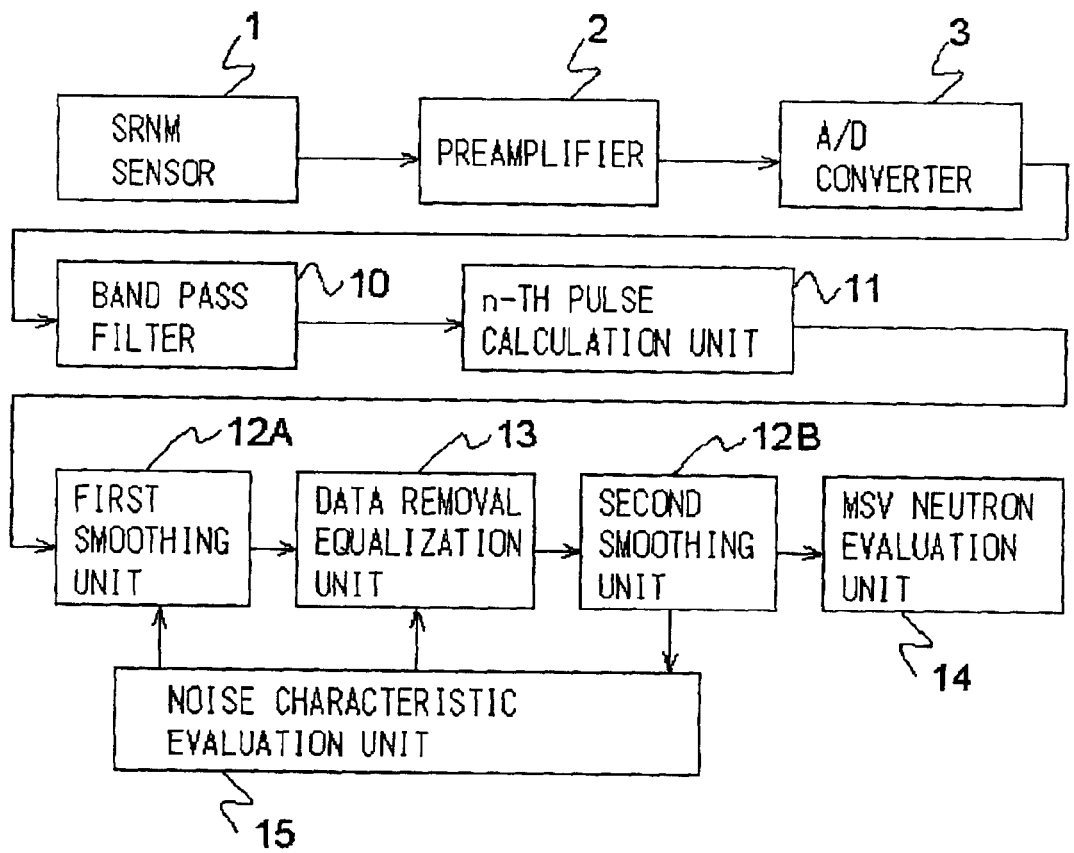
FIG. 8 is a basic block diagram showing a radiation measurement device of a fourth embodiment of this invention.

Next, a fourth embodiment of this invention is explained with reference to FIG. 8. In this embodiment, a preamplifier 2B having a band restriction function amplifies a signal outputted from the SRNM sensor and restricts the output in a certain frequency band, and then outputs a signal to the A/D converter 3. Digital data outputted from the A/D converter 3 are inputted into a band pass filter (BPF) 10, and is restricted to a specific frequency band.

Usually, the frequency band of the band pass filter 10 is settled by output characteristics of the SRNM sensor 1, and for example, the band pass filter 10 can be constituted as a digital filter which passes only the frequency component in the range between 100 kHz and 400 kHz. Although several measurement bands in the band pass filter 10 can be settled, in an explanation hereinafter, it is represented with a composition specifying one band.

In the digital filter processing, a sampling period and a number of bits of inputted sampled data are adjusted suitably according to a frequency band of the output of the band pass filter 10. The output of this band pass filter 10 is inputted into an n-th power value calculation unit 11 and is converted into an n-th moment value by calculating an n-th power value of each sampled data value.

In this embodiment, in an output side of the n-th power value calculation unit 10, a first smoothing unit 12A, a data removal equalization unit (DEA) 13 and a second smoothing unit 12B are arranged. The first smoothing unit 12A calculates an average of the n-th power values, that is, n-th moment values, within a first time width to output a first smoothed value. The data removal equalization unit 13 removes some of the first smoothed values outputted from the first smoothing unit 12A within a second smoothing time width and afterward calculates an average of the first smoothed values to output a second smoothed value. The second smoothing unit 12B calculates an average of the second smoothed values outputted from the data removal equalization unit 13 within a third smoothing time width to output a third smoothed value. Here, by adjusting a number of the data for calculating an average in at least one of the first smoothing unit 12A, the data removal equalization unit 13 and the second smoothing unit 12B, or at least one of the first time width, the second time width and the third time width, and a number of removing data in each second time width in the data removal equalization unit 13, based on a pulse width and an arrival interval of a surge-like noise and an arrival cycle of a foreign noise, the MSV measurement can be performed without influence from the foreign noises. Still more reliable measurement is realizable in this embodiment.

Furthermore, as one deformed example of this embodiment, it is also possible that the first smoothing unit 12A selects a maximum value of the n-th power values within the first time width instead of calculating the average, and afterward the data equalization unit 13 calculates an average of the maximum values within the second time width. By this example, the MSV indicated value can be obtained even if the counting rate is low, and thus a measurement minimum in the MSV measurement decided by a circuit noise of the preamplifier 2B, etc., can be expanded.

In addition, if n is set as an odd integer of not less than three in this embodiment, since a surge-like noise is a bipolar noise, the equalization processing offsets positive values and negative values of the noise. And by choosing a value of the same polarity as that of the homopolar sensor output, the influence of the surge-like noise can be reduced.

Hereinafter, in this embodiment, a square value represents as the simplest example on the n-th moment operation. That is, it explains by supposing that n equals two and a k-th output sampled data is denoted as S(k) and the n-th power calculation unit 11 calculates:

$$\text{Out1}(k)=S(k)*S(k) \tag{10}$$

The outputs Out1(k) are inputted into the first smoothing unit 12A, and a certain number of the outputs are equalized.

In this present circumstance, if an average of the output values of the band pass filter 10 has an offset, the average of sampled data S (k) and the square value of the average are also calculated, and it subtracts the square value of the average from the square operation result Out1(k). That is, in equalizing n pieces of values, it calculates:

$$\text{Out2}(k2)=(\Sigma\text{Out1}(k))/n-\{(\Sigma s(k))/n\}^2 \tag{11}$$

Here, the sigma Σ shows adding n pieces of sampled data.

In this situation, the adding number n is set as a number equivalent to pulse width of an assumed foreign noise, and moreover, this number is arranged as an n-th power of 2 so that it makes easier to carry out digital operation. That is, suppose that the noise is like a noise as shown in FIG. 8, that is, a pulse-like noise including surge-like noises with pulse width of 20 microseconds coming in at intervals of 2 milliseconds, and the output of the band pass filter 10 can be obtained in an intervals of 1 microsecond, it equalizes data of pulses with pulse width of not less than 20 microseconds.

However, in a digital calculation, since it is convenient for the digital calculation to enable division based on a bit shift operation, the adding data number is arranged as an n-th power value of 2, and in this case, it adds 32 pieces of data, that is, $2^5$. In this case, since an output interval of the band pass filter 10 is 1 microsecond, the output interval of this equalizing operation, that is, the first time width of the first smoothing unit 12A, is 32 microseconds, which is 32 times as long as that of the band pass filter output.

The outputs of this first smoothing unit 12A are inputted into the data removal equalization unit 13. The data removal equalization unit 12 divides the outputs of the first smoothing unit 13A at intervals of 32 microseconds for every specific number according to the second time width, and afterward compares sizes of data and thus removes specific data.

Figure 9:
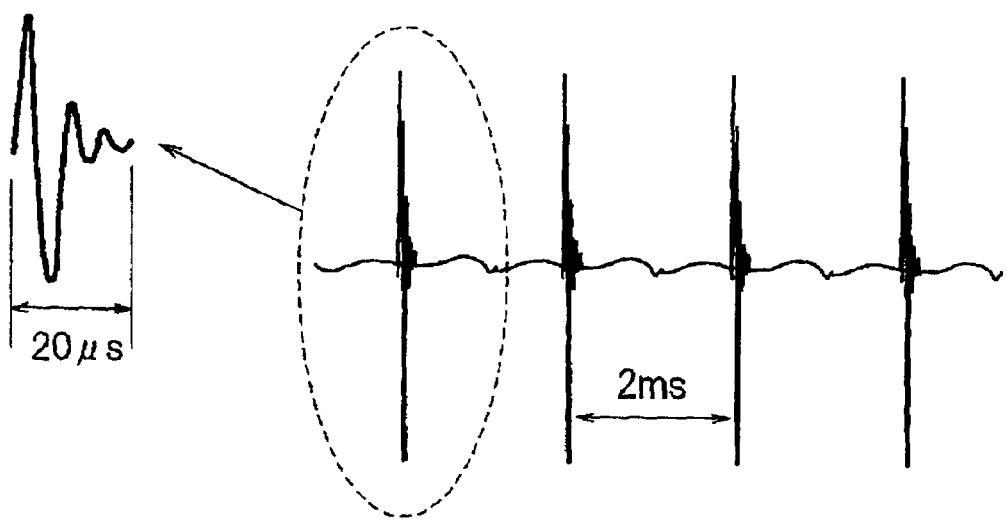
FIG. 9 is a waveform chart showing an example of a noise pulse, which invokes explanation of the third embodiment of this invention.

In the case shown in FIG. 9, if it is assumed there has been a removal of a surge noise, the following operation is carried out. An arrival interval of the surge-like pulse shown in FIG. 9 is about 2 milliseconds. Thus, by dividing the data at intervals of 2 milliseconds or less and removing only pulse data acquired by sampling the surge-like pulse among them, the remainder is convertible to a power value of data without noises. That is, if it compares size relation of data in this section and eliminates two or more pieces of data which are the largest of all, the influence due to this surge-like noise is removable.

Here, the minimum number of eliminating data is arranged two, because, depending on timing, there is the possibility where the surge noise with a pulse width of 20 microseconds is mixed into two output signals of the first smoothing unit 12A. Moreover, when the largest values are removed, in order to hold the average, it is also necessary to remove several pieces of the smallest values, the number of which is equal to the number of the data that had already eliminated as the largest values. In this case, two pieces of the smallest data should be removed also. Thus, the remaining data acquired by eliminating two largest values and two smallest values are equalized.

In the case shown in FIG. 9, assuming that one set consists of 36 pieces of outputs of the first smoothing unit 12A, the second time width of the data removal equalization unit 13 is about 1.16 microseconds, in which at most two surge pulses are contained; therefore, by removing two larger data and two smaller data, 32 pieces of data as the remainder are equalized. In this case, the data number in one set after the removing is determined as a number of the n-th power of 2.

Moreover, if an arrival interval of the surge-like pulse becomes short, it can remove the noise by, firstly, lessening the number of data added in the data removal equalization unit 13, together with evaluating a number of arriving surge-like pulses in the second time width in which the arithmetic average is calculated in the data removal equalization unit 13 and removing the double number of the evaluated arrival number of the surge-like pulse of larger values and smaller values, respectively.

However, when removing data in this way, the rate of data removal may become a subject. That is, if the numbers of the output pulses of the SRNM sensor 1 are not so much, the averaged power, that is, the MSV measurement value is displayed lower than an actual average due to data removal.

When the pulse number is sufficient, a certain degree of data removal is within an error range due to randomness of the data. As a result of our simulation, when the measurement minimum in the MSV measurement is set to a generating rate of the pulse, that is, $1*10^4$ CPS, it turns out that sufficient measurement accuracy can be obtained by equalizing several percent of data in the real time. Therefore, intermittent surge noises can be removed without affecting the measurement by removing data with satisfying a necessary removal limit rate acquired from the measurement accuracy.

As another function of the data removal equalization unit 13, even if the pulse generating rate of the SRNM sensor 1 is relatively low, it can obtain MSV indicated value by choosing the maximum value only.

That is, if a pulse generating rate is low, there is a lot of smoothing sections in which no one piece of the sensor pulse comes. Thus, by arranging that the smoothing operation does not contain this not-coming period, the MSV indicated value can be obtained even if the pulse generating rate is low, and thus the MSV measurement minimum can be extended. This method is a measurement method using both the pulse measurement method and the MSV measurement method. However, in this method, it is necessary to compensate linearity of the MSV indicated value to the pulse generating rate by using a compensation function in which the data removing rate is used as a parameter.

Figure 10:
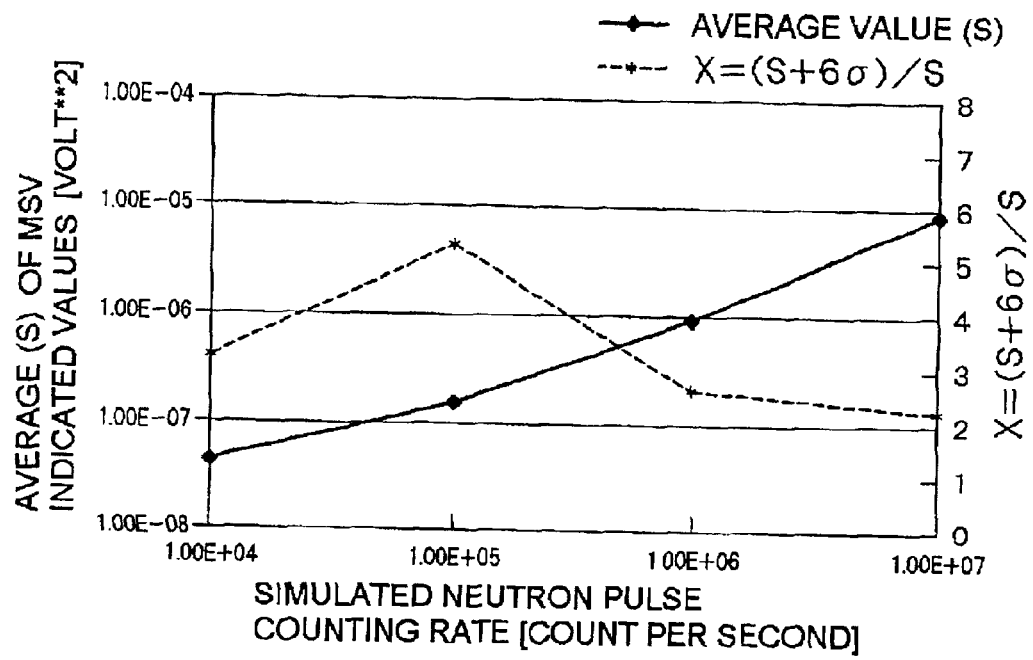
FIG. 10 is a graph showing transition of simulation result of a first smoothing unit in the fourth embodiment of this invention and an index X when an imitation neutron pulse is inputted.

Next, it explains one example of this embodiment concerning an operation standard of removing data in the data removal equalization unit 13. FIG. 10 shows a simulation example of smoothing an inputted simulated neutron pulse in a period of 32 microseconds by the first smoothing unit 12A. In FIG. 10, a solid line denotes an average S after smoothing the MSV indicated value corresponds to the left vertical axis in the figure. This figure shows that the MSV indicated value after the smoothing, i.e., the second power of voltage value, changes almost in proportion to the pulse counting rate in a range of more than $1*10^5$ CPS, which is included in the MSV measurement range. On the other hand, the MSV indicated value is not a proportionality relation to the pulse counting rate in a range between $1*10^4$ CPS and $1*10^5$ CPS due to influence of a circuit noise.

Moreover, the dashed line shows changing of an index X denotes as:

$$X=(S+6*\sigma)/S,$$

where S is the average value of the MSV indicated value and σ is a standard deviation, corresponding to the right vertical axis in FIG. 10. The maximum of X is about 5.3 at the MSV measurement minimum, and X changes mostly between two and three in the counting rate of over $1*10^6$ CPS by the same evaluation.

Figure 11:
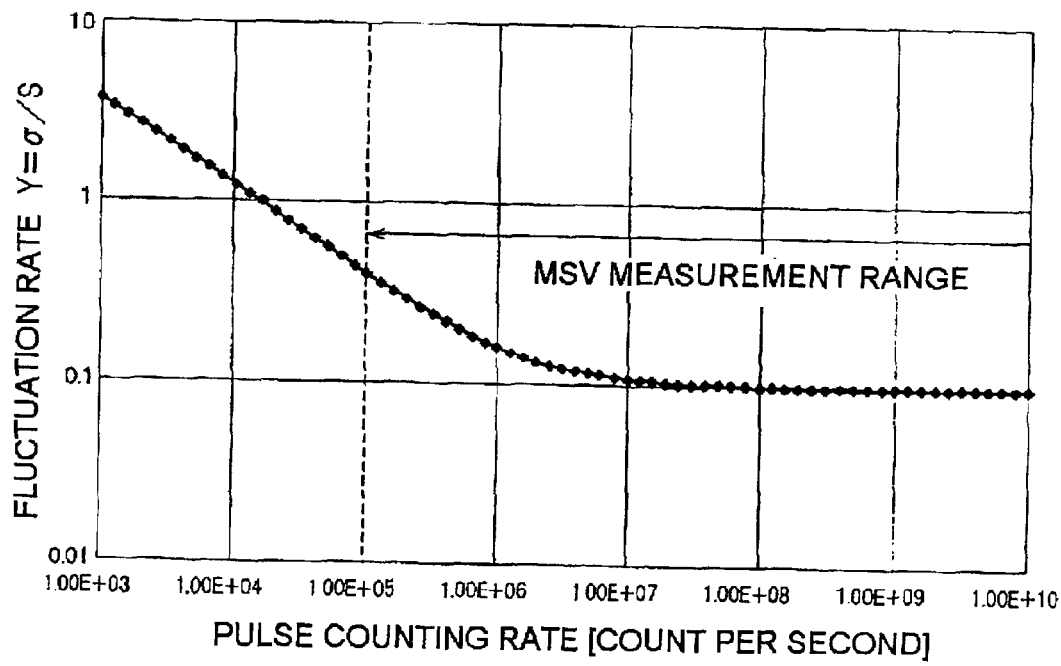
FIG. 11 is a graph showing evaluated fluctuation rate Y of an output of the first smoothing unit in the fourth embodiment of this invention.

On the other hand, as another evaluation method, FIG. 11 is a graph showing change of a fluctuation rate Y when a simulated neutron pulse is limited within band range between 100 kHz and 400 kHz by the band pass filter 10 and afterward equalized in 32 microseconds by the first smoothing unit 12A. The fluctuation rate Y is denoted by a formula: Y=σ/S. This figure shows that Y is not more than 0.4 in the MSV measurement range, whose minimum is $1*10^5$ CPS, the maximum fluctuation is at the minimum of the MSV measurement range.

As shown in these figures, the fluctuation of the waveform becomes large especially at around $1*10^5$ CPS which is the minimum of the MSV measurement range. Thus, by preliminarily evaluating the indices which denotes fluctuation degree such that the above-mentioned X or Y near the pulse counting rate $1*10^5$ where the fluctuation becomes large in a condition of the first time width of the first smoothing unit 12A, it is efficient to judge as a noise when the indices exceed the evaluated value acquired beforehand.

Namely, when digital data of a signal including pulse components are equalized in 32 microseconds as the first time width by the first smoothing unit 12A, by comparing the result after the smoothing with the evaluation index and basis which are obtained by using the result of evaluating a formerly inputted signal including pulse components in the first smoothing unit 12A or a simulated neutron pulse signal beforehand, the calculated value which exceeds the evaluation basis is judged as an unusual value. For example, a threshold value which is set as eight times as large as the smoothing result of the formerly inputted pulse signal.

Figure 12:
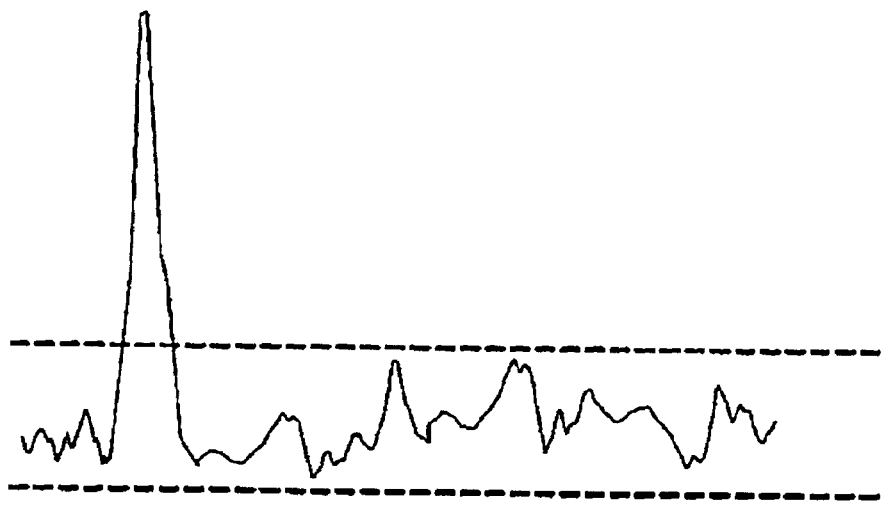
FIG. 12 is a waveform chart of an example of a pulse, which is quoted in explaining a correlation between a fluctuating value in MSV measurement and a noise in the fourth embodiment of this invention.

FIG. 12 typically shows a pulse waveform containing a noise. Usual MSV value is swinging in a range surrounded with dashed lines, and the part exceeding this range can be recognized as a noise. Though this threshold value changes with the average of the MSV indicated value, evaluation using the evaluated value at the minimum of the MSV measurement at which the fluctuation is the biggest can be applied as a conservative evaluation method at everywhere in the MSV measurement range.

Moreover, in the data removal equalization unit 13, there are two processing cases about the data corresponding to a part judges as a noise; one method is removing this data thoroughly, another method is replacing this data by a value in a range within the above-mentioned threshold value. In the former case, it can remove noises thoroughly but it has to evaluate the data removal rate in order to remove data within the above-mentioned permissible range of the data removal rate. In the latter case, it cannot perform perfect noise removal, but it is not necessary to evaluate the data removal rate.

Figure 13:
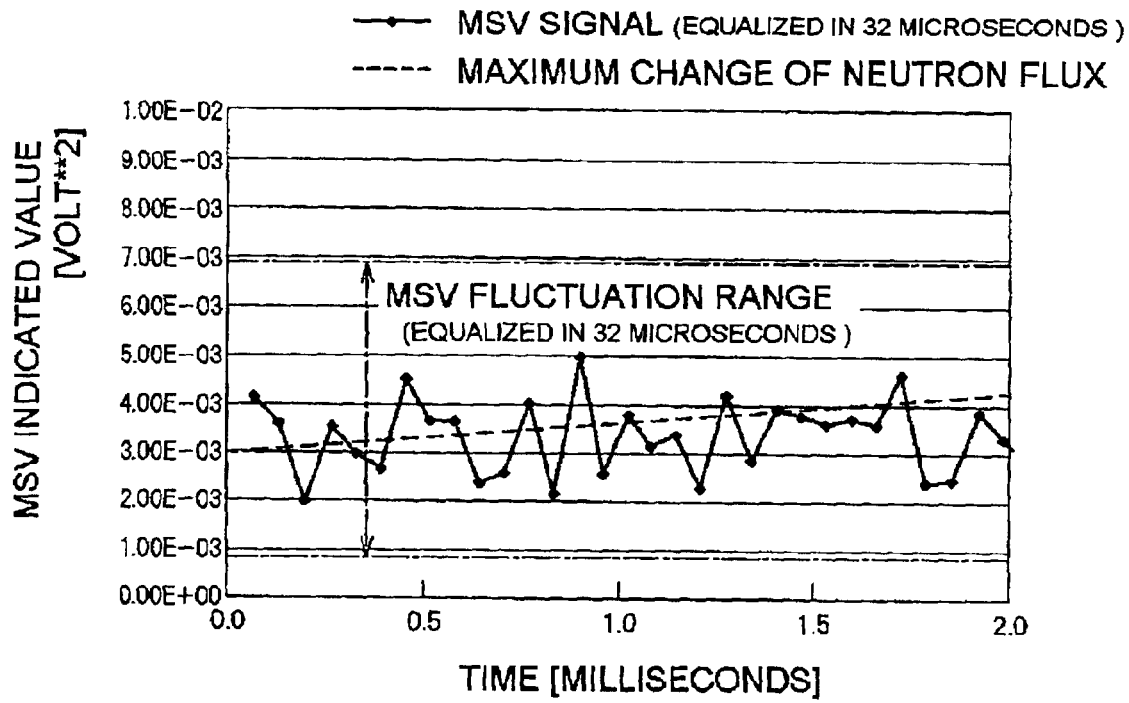
FIG. 13 is a graph showing a correlation between a fluctuation range of an indicated value and a change width of an average value in the MSV measurement, which is quoted in explaining an effect of the fourth embodiment of this invention.

Hereinafter, it explains an example of the latter case for replacing the value corresponding to a noise portion in detail. FIG. 13 is a graph showing a relation of the fluctuation range of the MSV indicated value and the change width of the average value. In this figure, a solid line denotes an output signal of the MSV measurement after equalizing the pulse in 32 microseconds, a dashed line denotes a maximum change of a neutron flux, and a dot dash line denotes a change width of the fluctuation of the MSV measurement evaluated by the above-mentioned matter. The change width of the fluctuation of the MSV measurement is sufficiently larger than the change rate of the neutron flux which should be measured primarily. Therefore, it is better to suppose that a case where it exceeds the evaluated fluctuation change width in the MSV measurement is judged as an unusual value.

Figure 14:
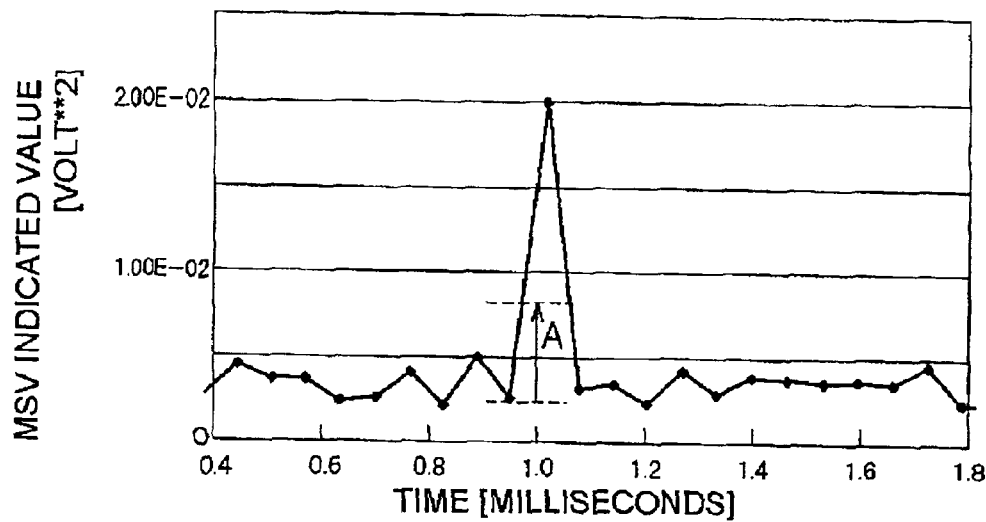
FIG. 14(a) is a graph showing an example of transition of an indicated value in the MSV measurement of a pulse in which a noise exceeding a maximum fluctuation range is induced.
FIG. 14(b) is a graph showing a processing result of the pulse corresponding in FIG. 14(a) by a data removal equalization unit in the fourth embodiment of this invention.
Figure 14:
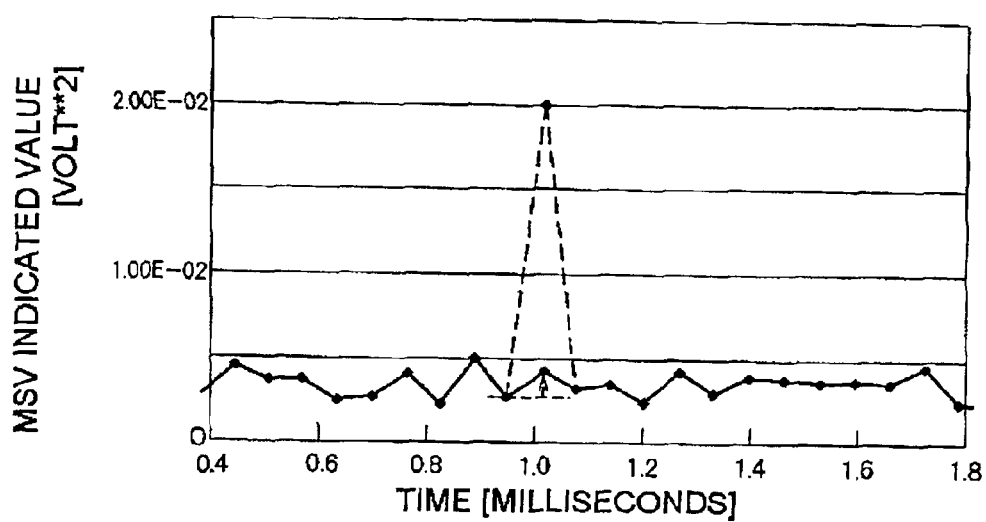

FIG. 14(a) shows an example of change of the MSV indicated value of a pulse in which a noise exceeding this fluctuation change width, i.e., the maximum fluctuation, is induced. In this figure, an arrow A is a threshold value specified as eight times of the fluctuation change width in the MSV measurement, for example, an evaluation result after smoothing of a formerly inputted pulse. And this unusual value is replaced by a normal value, which is calculated as a product of an original maximum change rate of the neutron flux and the last sampling value. The result of this replacement is shown in FIG. 14(b). Here, it can assume that the maximum change rate of the neutron flux in a width of 32 microseconds is, for example, about 1.03, which is sufficiently smaller than the above-mentioned fluctuation range of the MSV measurement, and in this case the unusual value is permuted by a value 1.03 times as large as the last value.

Therefore, by evaluating in advance a change rate in case an unusual value is detected, such as a maximum change rate of the neutron flux which should be monitored in a smoothing section, the unusual value can be removed limitedly without worsening time response of the measurement. That is, in this processing based on the fluctuation amount, by preliminarily evaluating a fluctuation range of the MSV indicated value, and by removing data exceeding this range or replacing data exceeding this range into a maximum value of the fluctuation, it becomes possible to secure an enough data number to be applied to the MSV calculation and acquire measurement result with little fluctuation.

Next, the output of the data removal equalization unit 13 is inputted into the second smoothing unit 12B, and is equalized so that a fluctuation of the measured values satisfies necessary measurement accuracy and it is in a range assuring a response demand. This result of the second smoothing unit 12B is inputted into the MSV neutron evaluation unit 14 and the measured MSV value is converted to a value of a neutron flux.

Moreover, in this embodiment, it is preferable to arrange a noise characteristics evaluation unit 15 for evaluating the minimum of the pulse width and arrival cycles of surge-like pulses, which are characteristics of noise waveforms, and setting the number of data used in the equalization processing in the first smoothing unit 12A, the averaging period and the number of removal data in the data removal equalization unit 13, and the time constant of smoothing filter in the second smoothing unit 12B.

As mentioned above, according to this composition, even if surge-like noises are induced in the MSV measurement, by evaluating pulse duration and an arrival cycle of the surge-like noise and removing surge noise data to a certain extent satisfying the data removal rate limit permissible in the MSV measurement, the intermittent surge noises can be removed completely.

Fourth Embodiment

Figure 15:
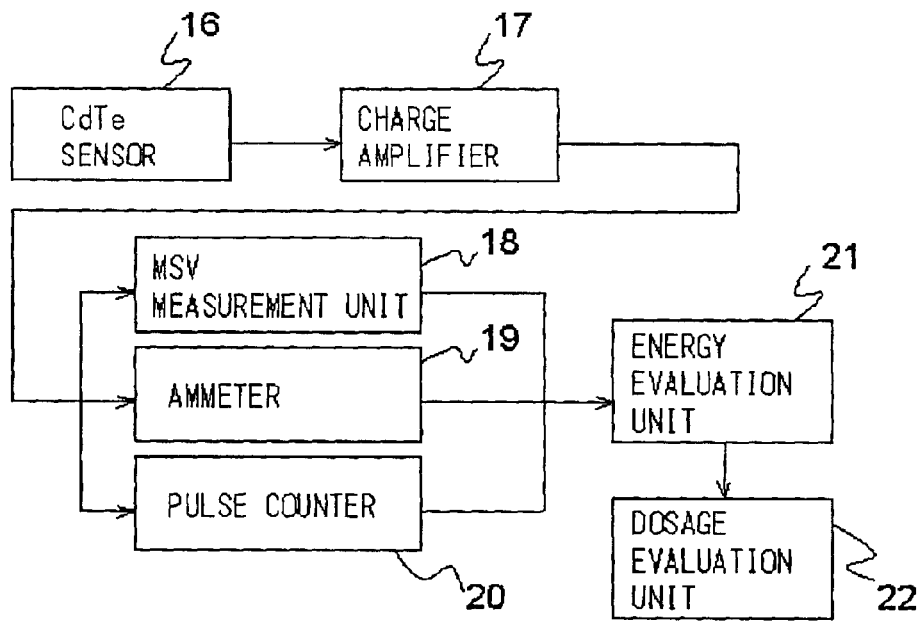
FIG. 15 is a basic block diagram showing a radiation measurement device of a fifth embodiment of this invention.

Next, a fifth embodiment of this invention is explained with reference to FIG. 15. A radiation measurement device of this embodiment shown in FIG. 15 has a CdTe sensor 16 using CdTe (cadmium, tellurium) which is a room-temperature semiconductor, as a radiation sensor.

As a radiation sensor, it is also possible to use a combination of a scintillation sensor, such as NaI, and photomultiplier tubes that enable to acquire energy information, or a Ge (germanium) sensor as a semiconductor sensor. The output of the CdTe sensor 16 is inputted into a charge amplifier (CA) 17. And this charge amplifier 17 integrates electric charge of pulse components included in an input signal and converts to a pulse having a pulse height based on the amount of the electric charges to be outputted. In addition, the charge amplifier 17 supplies operating voltage to the CdTe sensor 16.

An output of the charge amplifier 17 is transformed in waveform by such as a pileup rejection circuit or a pole zero cancellation circuit, which are generally used for measuring radiation energy, and afterward it is inputted to an MSV measurement unit 18, a current detector (CD) 19 and a pulse counter (PC) 20. In the MSV measurement unit 18, after restricting a frequency band, it averages the n-th powers and the average is converted to an MSV measurement value, i.e., a secondary moment value. The current detector 19 measures an average current value, which is a primary moment value, and the pulse counter 20 calculates a pulse number.

The MSV measurement value, the current measurement value, and the pulse enumerated number are inputted into an energy evaluation unit 21, respectively, and the energy evaluation unit 21 evaluates average radiation energy based on a ratio of the MSV value to the number of pulses or a ratio of MSV value to the direct current value, that is, a ratio of the secondary moment and the primary moment. This average energy value and the above-mentioned measured values are inputted into a dosage evaluation unit 22, and thus they are converted to an irradiation dose, or an absorbed dose in a substance, or a dose equivalent including a risk rate to a human body.

The output of the charge amplifier 17 is a pulse having a peak value proportional to a radiation energy absorbed in the CdTe sensor 16. Therefore, suppose that a probability where the reaction occurs is N and the absorption energy is q, the MSV value, the pulse enumerated number and the current value can be approximated by the following formulas:

MSV value: $k_1 * q^2 * N$, n-th moment value: $k_n * q^n * N$,

Pulse enumerated number: $k_2*N$, and

Direct current value (primary moment value): $k_0*q*N$,

Here, $k_0$, $k_1$, $k_2$ and $k_n$ are compensation coefficients, respectively. And their ratios are:

MSV value/pulse enumerated number=$k_1*q^2$ (generally, $k_n*q^n$),

MSV value/direct-current value=$(k_1/k_0)*q$, and n-th moment value/n' moment value=$k_n*q^{n-n'}/k_{n'}$.

Therefore, it can presume the absorption energy in a crystal by evaluating these compensation coefficients $k_0$, $k_1$, $k_2$ and $k_n$, etc., beforehand and using ratios of these measured values.

Figure 16:
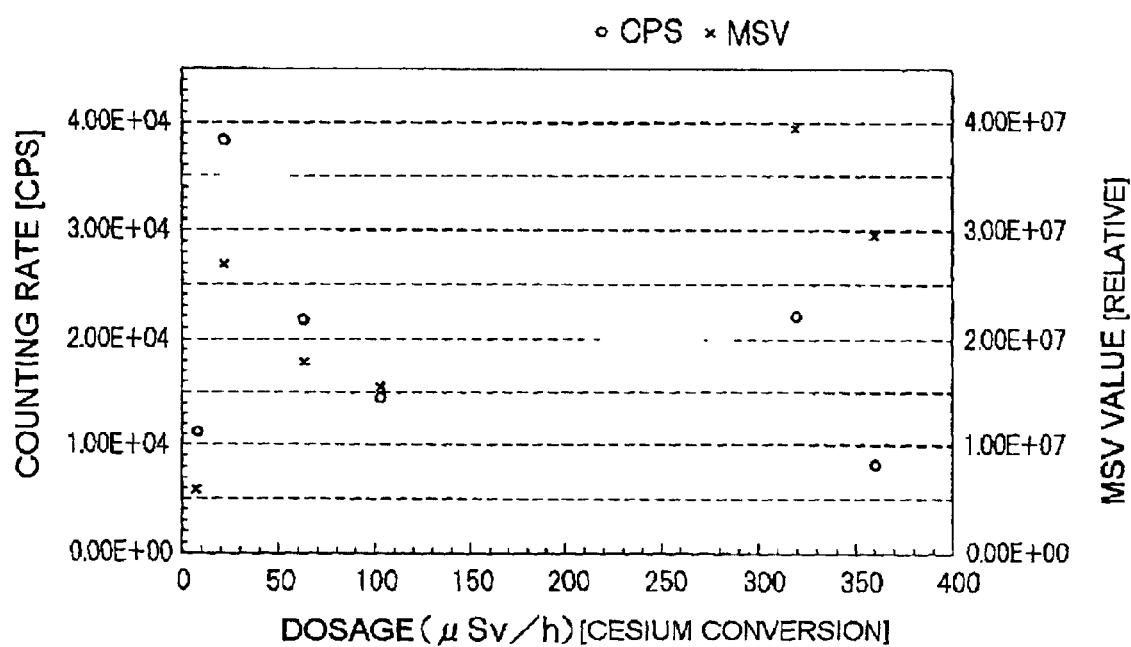
FIG. 16 is a graph showing a correlation of value indicated by MSV of a CdTe sensor and a pulse enumerated count with a dosage, which is quoted in explanation of the fifth embodiment of this invention.
Figure 17:
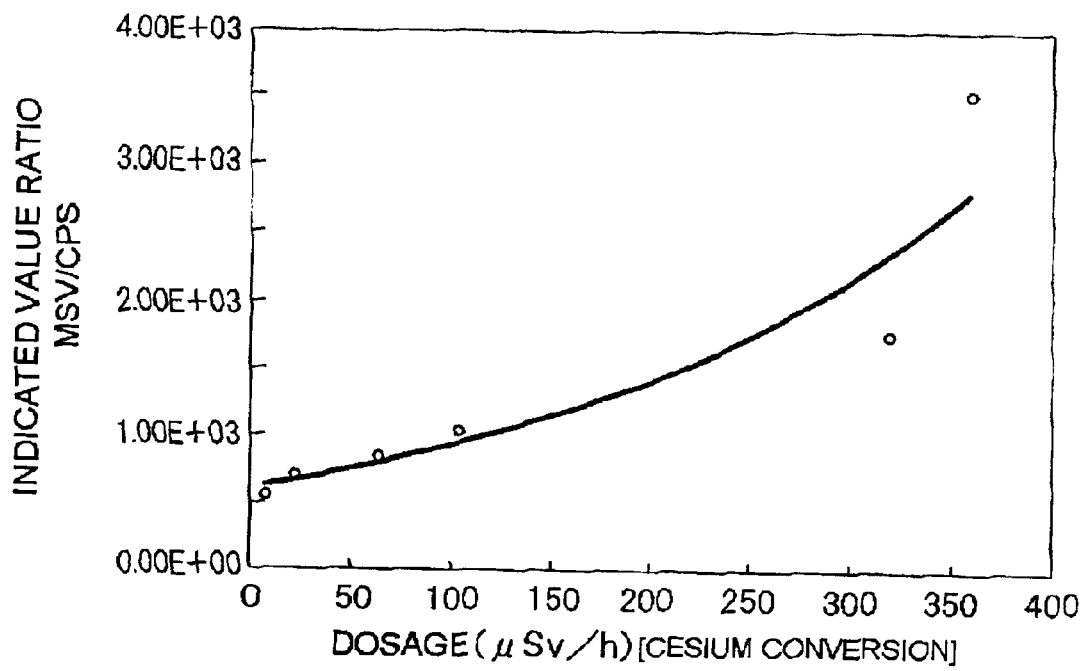
FIG. 17 is a graph showing a ratio of the MSV indicated value of the CdTe sensor to the pulse enumerated count with change of the dosage, corresponding to data shown in FIG. 16.
Figure 18:
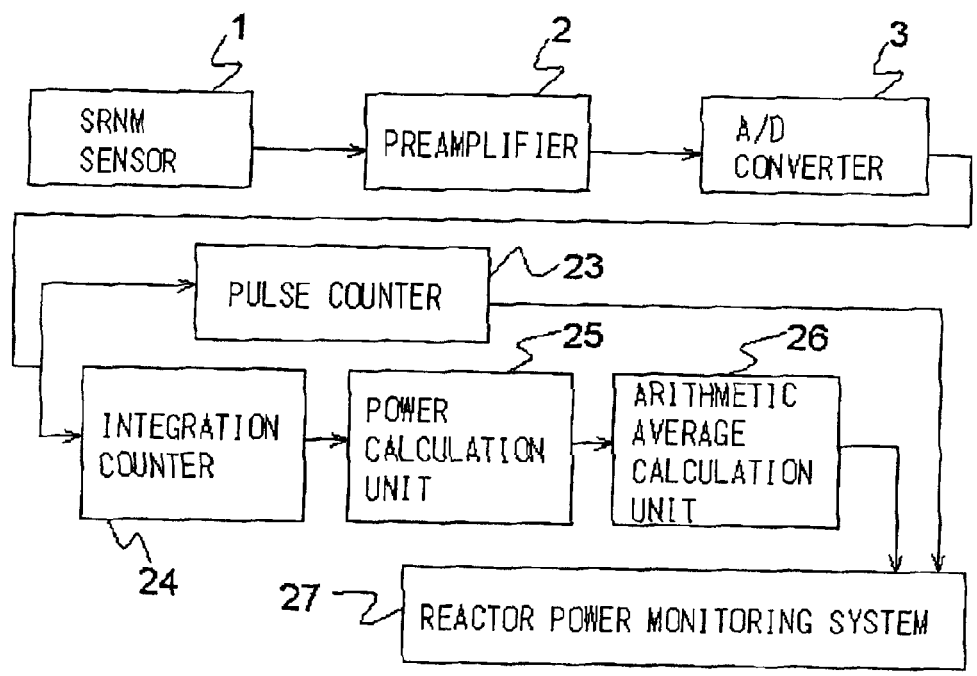
FIG. 18 is a basic block diagram showing a conventional digital nuclear reactor start-up monitoring system.

FIG. 16 is a plotted graph showing a relation of the pulse enumerated number and the MSV value (shown in a vertical axis) and a dosage (shown in a horizontal axis) measured by a commercial radiation surveymeter when it measures radiations of various radioactive elements, that is, radiations having different energy respectively, by the CdTe sensor 16.

Generally, the surveymeter, etc., is adjusted in internal compensation coefficients or shielded, so that sensitivity characteristics to the radiation energy agree with an evaluation curve of the dose equivalent to the radiation energy.

That is, although a pulse counting rate becomes large to a radiation having low energy since its absorption energy when one radiation is irradiated is low, the dosage of one radiation in this case becomes low. On the contrary, although a pulse counting rate becomes low to a radiation having high energy, the dosage becomes large since an amount of electric charges generated by one radiation is large. Thus, it is adjusted by shielding, etc., so that the pulse counting number or the current value sensitivity becomes the same as a contribution rate to the dose equivalent.

Since the case shown in FIG. 16 omits this sensitivity compensation, the pulse enumerated number is large in a radiation with low energy, and the pulse enumerated number and the MSV measurement value become random to the dose equivalent. However, if it is plotted as characteristics to the dosage of a ratio of the MSV value to the pulse enumerated number, as shown in FIG. 11, it becomes monotonous characteristics to the dose equivalent. Thus, it is possible to convert the ratio of these to the dose equivalent by evaluating these characteristics in advance.

Similarly, since the ratio of the MSV value to the pulse enumerated number serves also as monotonous characteristics to incident energy, it is possible to presume average incident radiation energy by evaluating these characteristics in advance. In this case, it becomes possible to evaluate an absorbed dosage at each part of a human body to the radiation energy more accurately by using absorption characteristics of the part of a human body.

Furthermore, there are two cases to evaluate the dosage by the pulse measurement. One case is a method for converting energy information of the incident radiation acquired by measuring a pulse height distribution of the pulse to the dosage, and another case is a method for equalizing the sensitivity of the pulse measurement and dosage response characteristics by devising structure itself of the above-mentioned sensor. Moreover, as a way of evaluating the dosage by the current value, there is a method of adjusting a sensitivity response by the devising the sensor structure mentioned as the latter method of the above-mentioned cases.

Therefore, it can perform still more accurate dosage evaluation by using both these common techniques and the dosage evaluation method in this embodiment. That is, for example, if it uses the evaluated compensation function in this embodiment after adjusting the sensitivity characteristics of the sensor to some extent independently, it becomes possible to perform still more exact dosage evaluation.

Furthermore, if the pulse is piled up in a high counting rate with dropout count, it cannot evaluate an accurate dosage by the method of converting the acquired pulse height information into the dosage mentioned as the former method of the above-mentioned cases. And in the latter shielding method of the above-mentioned cases, it must rectify a number of the dropout count.

However, in this embodiment, it is possible to evaluate the dosage in the MSV measurement and measure in a large range by performing the pulse measurement and the MSV measurement simultaneously, even when the pulse measurement is saturated by the pileup. Although it needs to rectify the pileup effect of the pulse measurement in the presumption of the average energy in this case, the error can be suppressed in a range which can be neglected by making the sensitivity of the sensor itself approximate to the dosage response to some extent.

Moreover, if it uses a ratio of the current value to the pulse enumerated number or a ratio of the MSV value to the current value, as well as the ratio of the MSV value to the pulse enumerated value, it can presume the average radiation energy by acquiring a compensation function similar to that of the case mentioned above.

In this way, according to this embodiment, by using both the n-th moment value and the pulse measurement together, it can evaluate the dosage accurately based on the presumption of the average incident energy. Moreover, even if it is in a condition occurring counting error due to the pileup of the pulses, by using the ratio of the n-th moment to another n-th moment, it can presume the average energy similarly, and the dosage evaluation is carried out exactly in a measurement range larger than that of the conventional method.

Furthermore, hereinafter it explains a deformed example of this embodiment. Here it can presume energy distribution by calculating the first power value, that is an average current, and the second value, the third value, etc., and the n-th power value, instead of the MSV value, and calculating a compensation function of each value, respectively, and solving a reverse matrix of each compensation function, respectively.

That is, the measurement value of each n-th moment can be expressed as follows:

$x_1=a_1[1{:}n]*E[n{:}1]$, (equivalent to the current measurement value)

$x_2=a_2[1{:}n]*E[n{:}1]$, (equivalent to the MSV measurement value)

$x_3=a_3[1{:}n]*E[n{:}1]$, $x_n=a_n[1{:}n]*E[n{:}1]$, wherein, $x_k$: k-th moment value [scalar quantity], $a_k$: Response matrix [matrix with one line and n columns], E: Energy distribution [matrix with n lines and one column].

Here, it can denote the relation of the matrices X and E by using a matrix A with n lines and n columns, as follows:

$X[n{:}1]=A[n{:}n]*E[n{:}1]$.

Thus, the radiation energy distribution can be acquired by solving a reverse matrix of the matrix A, such as:

$E[n{:}1]=A^{-1}[n{:}n]*X[n{:}1]$.

However, in this moment measurement from the first power to the n-th power, it is sufficient to select the number of the moments corresponding to a necessary energy bandwidth from the above-mentioned formulas, and it can consist only of alternating current measurement means by removing the average current value as the first moment among the moment values.

As mentioned above, by combining the MSV measurement and one of the pulse measurement and the current measurement, it can presume the average radiation energy by the ratio and convert it to the dosage. This can easily realize characteristics which are more similar to the dosage response by using together with a conventional technique of rectifying the sensitivity by changing the sensor structure. Moreover, it is not necessary to sort out the pulse height for realizing with easy composition, compared with the conventional technique of computed the dosage by questing the pulse height.

Furthermore, it can reconstruct the radiation energy by using two or more n-th moment values, and it can measure the radiation energy distribution even in the case of high counting rate making the pulse measurement difficult, and evaluate the dosage more accurately from this information.

In this way, by using this method independently or combined with the conventional dosage evaluation method, it can provide a radiation measurement device for collectively monitoring in a wider range more exactly.

As explained above, according to the radiation measurement device of the above-mentioned embodiments in this invention, it can reduce a bipolar circuit noise with a small signal level and an alpha ray noise of the sensor and a ratio of these noises to the sensor pulse, by calculating the n-th power values of the pulse waveform and discriminating with the values, and thus it can measure a sensor signal which is mixed in the circuit noise in the conventional method.

The foregoing discussion discloses and describes merely a number of exemplary embodiments of the present invention. As will be understood by those skilled in the art, the present invention may be embodied in other specific forms without departing from the spirit or essential characteristics thereof. Accordingly, the disclosure of the present invention is intended to be illustrative of, but not limiting to, the scope of the invention, which is set forth in the following claims. Thus, the present invention may be embodied in various ways within the scope of the spirit of the invention.

What is claimed is:

1. A device for measuring radiation comprising:
   a radiation detector which generates an analog signal containing pulse components corresponding to a dosage of an inputted radiation;
   an A/D converter which regularizes the analog signal outputted from the radiation detector and converts the regularized analog signal into sampled data;
   an n-th power pulse discrimination unit which calculates an n-th power value for each of the sampled data outputted from the A/D converter and discriminates the pulse components contained in the analog signal of the radiation based on the calculated n-th power values to generate a discrimination signal associated with each discriminated pulse component, where n is an integer of not less than two; and
   a pulse counter which counts a number of the discriminated pulse components based on the discrimination signal outputted from the n-th power discrimination unit.

2. The device as recited in claim 1, wherein:
   the n-th power pulse discrimination unit compares the calculated n-th power values with a predetermined discrimination level and discriminates the pulse components of the radiation based on the comparison result.

3. The device as recited in claim 1, wherein the n-th pulse discrimination unit comprises:
   a difference discrimination unit which calculates a difference index corresponding to a pulse height of each of the pulse components included in the analog signal based on the n-th power values of four series sampled data $S(k-3)$, $S(k-2)$, $S(k-1)$ and $S(k)$ at four series times $(k-3)$, $(k-2)$, $(k-1)$ and $(k)$, respectively, outputted from the A/D converter, with a time difference of times $(k-3)$ and $(k)$ corresponding to a pulse width of the pulse components of the radiation, and discriminates the pulse components of the radiation based on the calculated difference index to generate the discrimination signal.

4. The device as recited in claim 3, wherein:
   the difference discrimination unit calculates a difference index X corresponding to the pulse height of the pulse components included in the analog signal based on the equation:

$$X=(b*S(k-2)+c*S(k-1))^n-(a*S(k-3)+d*S(k))^n$$

where, n is an integer of not less than two and a, b, c and d are non-zero constants, respectively, and discriminates the pulse components of the radiation based on the calculated difference index X to generate the discrimination signal.

5. The device as recited in claim 3, wherein:
   the difference discrimination unit calculates the difference index Y corresponding to the pulse height of the pulse components included in the analog signal based on the equation:

$$Y=(c*S(k-1)-d*S(k))^n+(a*S(k-3)-b*S(k-2))^n$$

where, n is an integer of not less than two and a, b, c and d are non-zero constants, respectively, and discriminates the pulse components of the radiation based on the calculated difference index Y to generate the discrimination signal.

6. The device as recited in claim 1, wherein the n-th power pulse discrimination unit comprises:
   a difference discrimination unit which calculates a difference index corresponding to a pulse height of each of the pulse components included in the analog signal based on the n-th power values of four series sampled data $S(k-3)$, $S(k-2)$, $S(k-1)$ and $S(k)$ at four series times $(k-3)$, $(k-2)$, $(k-1)$ and $(k)$, respectively, outputted from the A/D converter, with a time difference of times $(k-3)$ and $(k)$ corresponding to a pulse width of the pulse component of the radiation, and for discriminates the pulse components of the radiation based on the calculated difference index;
   an integration discrimination unit which calculates an integration value I corresponding to a pulse height of each of the pulse components based on the four series sampled data $S(k-3)$, $S(k-2)$, $S(k-1)$ and $S(k)$ according to the equation:

$$I=S(k-3)^n+S(k-2)^n+S(k-1)^n+S(k)^n,$$

and discriminates the pulse component of the radiation based on the calculated integration value I; and
   a pulse height and power calculation unit which calculates a ratio of the difference index outputted from the difference discrimination unit to the integration value I outputted from the integration discrimination unit, and discriminates the pulse component of the radiation based on the ratio to generate the discrimination signal.

7. A device as recited in claim 1, further comprising:
   a homopolar conversion unit which deletes one of either positive data and negative data included in the sampled data outputted from the A/D converter to generate homopolar sampled data;

wherein the n-th power discrimination unit calculates the n-th power values of the homopolar sampled data outputted from the homopolar conversion unit and discriminates the pulse component of the radiation based on the corresponding value, n being an even integer of not less than two.

* * * * *